(12) United States Patent  
Kim et al.

(10) Patent No.: US 11,134,222 B2  
(45) Date of Patent: Sep. 28, 2021

(54) REFRIGERATOR AND METHOD OF CONTROLLING THE SAME

(71) Applicant: Samsung Electronics Co., Ltd, Suwon-si (KR)

(72) Inventors: Yong Jun Kim, Bucheon-si (KR); Hyeon Ji Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/643,449

(22) PCT Filed: Aug. 30, 2018

(86) PCT No.: PCT/KR2018/010054  
§ 371 (c)(1),  
(2) Date: Feb. 28, 2020

(87) PCT Pub. No.: WO2019/045481  
PCT Pub. Date: Mar. 7, 2019

(65) Prior Publication Data  
US 2020/0195890 A1 Jun. 18, 2020

(30) Foreign Application Priority Data  
Aug. 30, 2017 (KR) .......... 10-2017-0110487

(51) Int. Cl.  
*H04N 7/18* (2006.01)  
*G06Q 10/08* (2012.01)  
(Continued)

(52) U.S. Cl.  
CPC ............. *H04N 7/181* (2013.01); *F25D 11/02* (2013.01); *F25D 29/00* (2013.01);  
(Continued)

(58) Field of Classification Search  
CPC ........................ F25D 2400/36; H04N 7/181  
(Continued)

(56) References Cited

U.S. PATENT DOCUMENTS 8,371,135 B2    2/2013  Lee  
2007/0064106 A1*  3/2007  An .................. H04N 7/181  
                                        348/143  
(Continued)

FOREIGN PATENT DOCUMENTS

CN      103019116 A     4/2013  
JP      2006-064320 A   3/2006  
(Continued)

OTHER PUBLICATIONS

International Search Report dated Jan. 8, 2019 in connection with International Patent Application No. PCT/KR2018/010054, 2 pages.

(Continued)

*Primary Examiner* — Amir Shahnami

(57) ABSTRACT

Disclosed is a refrigerator including: a second main body including a second camera configured to photograph a second storage chamber; and a first main body including a first display provided on at least one side of the first main body, a first camera configured to photograph a first storage chamber, and a first controller allowing an image captured by the first camera and an image captured by the second camera to be displayed on the first display. The refrigerator allows information about stored contents stored in a plurality of main bodies to be displayed on a single display, and thus a user may easily manage the stored contents in the plurality of main bodies.

15 Claims, 23 Drawing Sheets

(51) Int. Cl.
*F25D 11/02* (2006.01)
*F25D 29/00* (2006.01)

(52) U.S. Cl.
CPC ... *G06Q 10/0875* (2013.01); *F25D 2400/361* (2013.01); *F25D 2700/16* (2013.01)

(58) Field of Classification Search
USPC .......................................................... 348/159
See application file for complete search history.

(56) References Cited

U.S. PATENT DOCUMENTS

| | | | | |
|---|---|---|---|---|
| 2014/0169640 | A1* | 6/2014 | Park | F25D 29/00 382/110 |
| 2014/0293060 | A1* | 10/2014 | Ryu | F25D 29/00 348/159 |
| 2015/0002660 | A1* | 1/2015 | Lee | F25D 29/00 348/135 |
| 2015/0149298 | A1* | 5/2015 | Tapley | G06Q 30/0269 705/14.66 |

FOREIGN PATENT DOCUMENTS

| | | |
|---|---|---|
| KR | 10-2009-0020173 A | 2/2009 |
| KR | 10-2010-0059621 A | 6/2010 |
| KR | 10-1375906 B1 | 3/2014 |
| KR | 10-2015-0026412 A | 3/2015 |
| WO | 03/064945 A1 | 8/2003 |

OTHER PUBLICATIONS

Office Action dated Apr. 19, 2021 in connection with Chinese Patent Application No. 201880056677.3, 19 pages.

* cited by examiner

REFRIGERATOR AND METHOD OF CONTROLLING THE SAME

CROSS-REFERENCE TO RELATED APPLICATIONS

This application is a 371 of International Application No. PCT/KR2018/010054 filed Aug. 30, 2018, which claims priority to Korean Patent Application No. 10-2017-0110487 filed Aug. 30, 2017, the disclosures of which are herein incorporated by reference in their entirety.

1. Field

The present disclosure relates to a refrigerator and a method of controlling the same, and more particularly, to a technique for displaying information and images about stored contents stored in a plurality of main bodies on a single display.

2. Description of Related Art

A refrigerator is a device that store contents, such as foodstuffs, beverages, and the like for a long period of time without decaying. The refrigerator is usually provided with a refrigerating chamber for keeping the stored contents refrigerated and a freezing chamber for keeping the stored contents frozen.

The refrigerator repeatedly performs a cooling cycle including a compression, a condensation, an expansion, and an evaporation of refrigerant to maintain the temperature of the storage chamber at a predetermined target temperature. In detail, the refrigerator supplies each storage chamber with air cooled by a corresponding evaporator provided for each storage chamber on the basis of the target temperature of each storage chamber such that the temperature of the storage chamber is maintained at the target temperature. The evaporator evaporates the refrigerant to cool the storage chamber, and in the course of evaporation, frost is formed on the evaporator, and the refrigerator is provided with a defrost heater for removing the frost formed on the evaporator.

In addition, the refrigerator performs a food management function of displaying information about food items stored in the storage chamber according to the user's request, managing the expiration date of each food item, and warning a user that a food item in the refrigerator has passed the expiration date.

In addition, at an outside of a main body of the refrigerator, a display is provided such that a user may easily recognize the stored contents stored in the storage chambers through a camera mounted inside the main body without opening doors.

However, since it is not that all the main bodies of the refrigerator have displays, a main body having no display is difficult to check the stored contents stored in the storage chamber unless a user opens a door, thereby causing difficulty in managing the stored contents.

SUMMARY

Therefore, it is an object of the present disclosure to provide a refrigerator in which information about stored contents stored in a main body having no display is displayed at another main body having a display, thereby allowing a user to manage stored contents stored in a plurality of main bodies using a single display.

Therefore, it is an aspect of the present invention to provide a refrigerator including: a second main body including a second camera configured to photograph a second storage chamber; and a first main body including a first display provided on at least one side of the first main body, a first camera configured to photograph a first storage chamber, and a first controller allowing an image captured by the first camera and an image captured by the second camera to be displayed on the first display.

The first controller may allow the image captured by the first camera and the image captured by the second camera to be sequentially or simultaneously displayed.

The first controller may allow the image captured by the first camera and the image captured by the second camera to be displayed on the first display in different sizes according to a predetermined reference.

The first controller may allow the image captured by the first camera and the image captured by the second camera to be displayed on the first display in a predetermined order.

The first main body may further include a first input configured to receive information about a stored content stored in the first storage chamber and the second storage chamber.

The information about the storage content may include at least one of a type of the stored content, a name of the stored content, a purchase date of the stored content, a stored location of the stored content, and a shelf lifetime of the stored content. The first controller may allow a list of the stored contents to be generated on the basis of the information about the stored contents, and the generated list to be displayed on the first display.

The first controller may allow the image captured by the first camera, the image captured by the second camera, and the generated list to be sequentially or simultaneously displayed on the first display.

The first controller may allow the stored contents stored in the first storage chamber and the second storage chamber to be classified according to a reference received from a user, and the stored contents as classified to be displayed on the first display.

The first controller may display the classified stored contents on the first display so as to be distinguished from other stored contents not classified.

The reference may include at least one of a type of the stored content, a name of the stored content, and a shelf lifetime of the stored content.

The second main body may further include a second communicator configured to transmit the image captured by the second camera to the first main body or an external server, and the first main body may further include a first communicator configured to receive the image captured by the second camera from the second communicator or the external server.

The first communicator may transmit the image captured by the first camera and the image captured by the second camera to a mobile terminal of a user.

The first communicator may receive an image of a stored content stored in a storage chamber of at least one other main body from the external server.

The first controller may allow the image of the stored content stored in the storage chamber of the other main body, the image captured by the first camera, and the image captured by the second camera to be sequentially or simultaneously displayed on the first display.

The second main body may further include: a second display provided at one side of the second main body; and a second controller allowing the image captured by the first camera and the image captured by the second camera to be sequentially or simultaneously displayed on the second display.

It is another aspect of the present invention to provide a method of controlling a refrigerator including a first main body provided at one side thereof with a first display and a second main body, the method including photographing a first storage chamber of the first main body; photographing a second storage chamber of the second main body; and displaying the image of the first storage chamber and the image of the second storage chamber on the first display.

The displaying on the first display may include: sequentially or simultaneously displaying the image of the first storage chamber and the image of the second storage chamber on the first display.

The displaying on the first display may include: displaying the image of the first camera and the image of the second camera on the first display in different sizes according to a predetermined reference, or displaying the image of the first camera and the image of the second camera on the first display in a predetermined order.

The method may further include: receiving information including at least one of a type of the stored content, a name of the stored content, a purchase date of the stored content, a stored location of the stored content from a user.

The displaying on the first display may include generating a list of the stored contents on the basis of the information about the stored contents, and displaying the generated list on the first display.

The displaying on the first display may include sequentially or simultaneously displaying the image of the first storage chamber, the image of the second storage chamber, and the generated list on the first display.

The displaying on the first display may include classifying the stored contents stored in the first storage chamber and the second storage chamber according to a reference received from a user, and displaying the stored contents as classified on the first display. The received reference may include at least one of a type of the stored content, a name of the stored content, and a shelf lifetime of the stored content.

The method may further include receiving an image of a stored content stored in a storage chamber of at least one other main body from an external server, and sequentially or simultaneously displaying the image of the stored content stored in the storage chamber of the other main body, the image of the first storage chamber, and the image of the second storage chamber on the first display.

The second main body may further include: a second display provided at one side of the second main body, and the method may further include sequentially or simultaneously displaying the image of the first storage chamber and the image of the second storage chamber on the second display.

DETAILED DESCRIPTION

The embodiments set forth herein and illustrated in the configuration of the present disclosure are nothing but the most preferred embodiment only and do not represent all the technical spirit of the present disclosure, so that it should be understood that various equivalents and modifications can replace them.

The terminology used herein is for the purpose of describing particular embodiments only and is not intended to be limiting of the disclosure. As used herein, the singular forms "a," an and the are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms "first," "second," "A," "B," etc. may be used to describe various components, the terms do not limit the corresponding components, but are used only for the purpose of distinguishing one component from another component. For example, without departing from the range of the rights of the present disclosure, a first component may be referred to as a second component, and similarly the second component may be referred to as the first component. The term "and/or" refers to a combination of a plurality of related, described items or any of the plurality of related, described items.

In the description of the embodiments, the detailed description of related known functions or constructions will be omitted herein to avoid obscuring the subject matter of the present disclosure.

Figure 1:
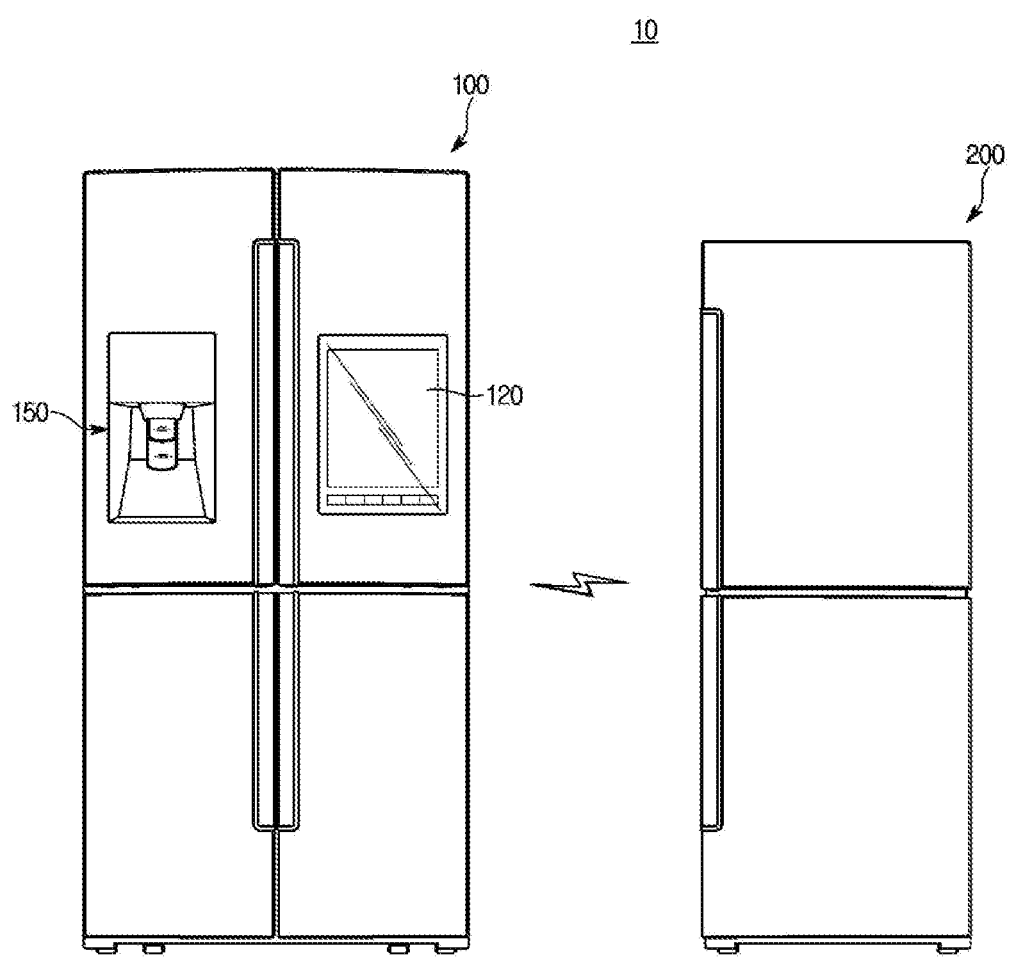
FIG. 1 is a view illustrating the external appearance of a refrigerator including a first main body and a second main body according to an embodiment.
Figure 2:
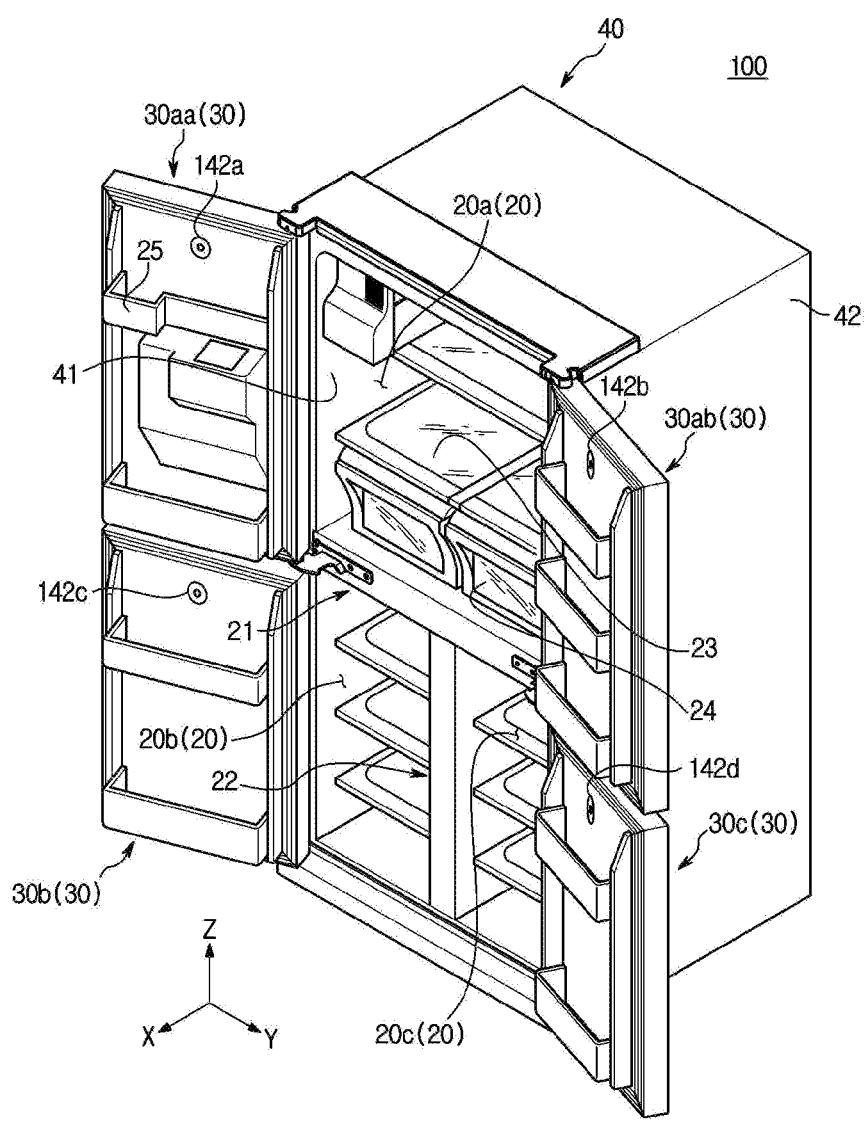
FIG. 2 is a front view of the first main body according to an embodiment.
Figure 3:
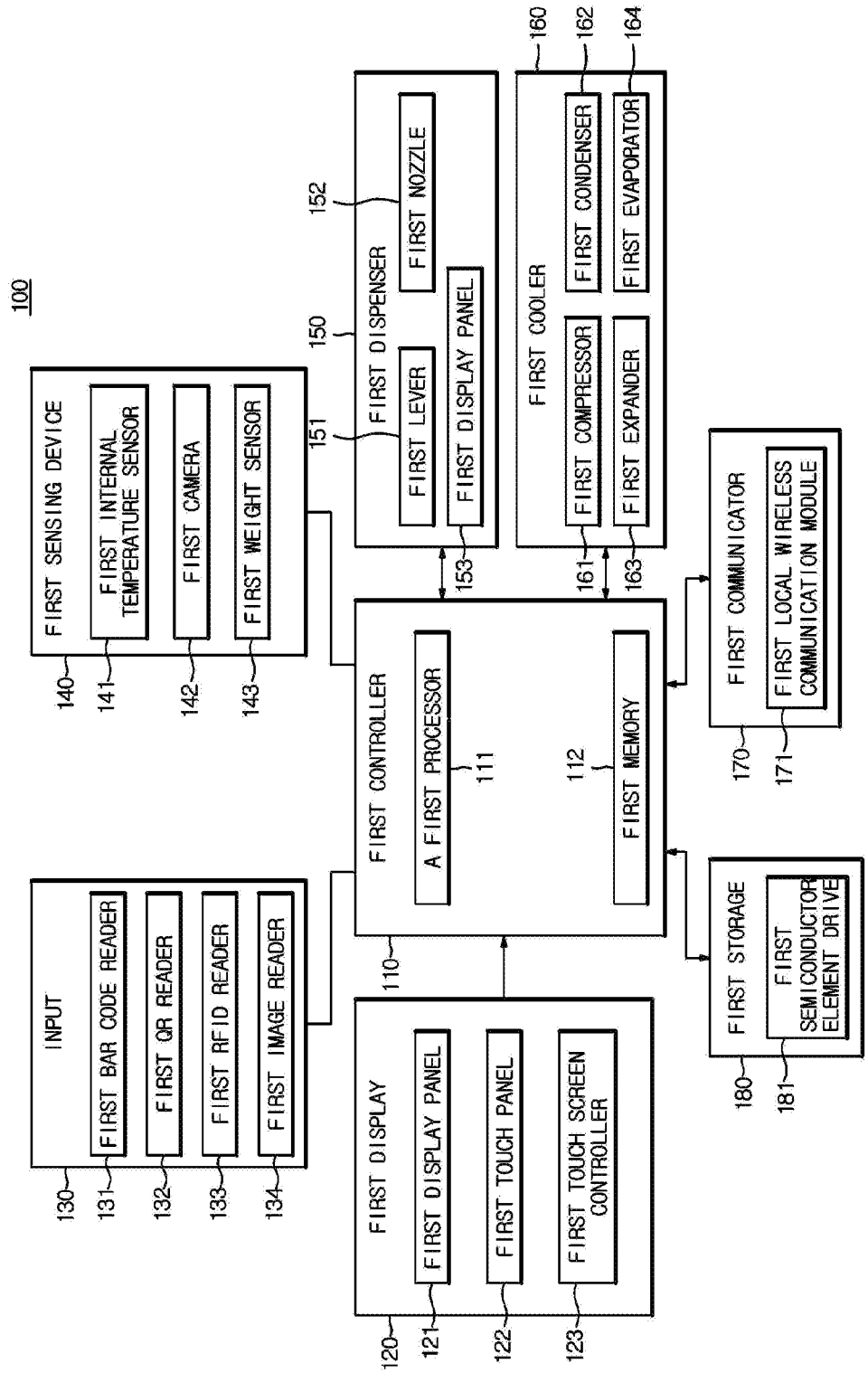
FIG. 3 is a block diagram illustrating some components of a first main body according to an embodiment.
Figure 4:
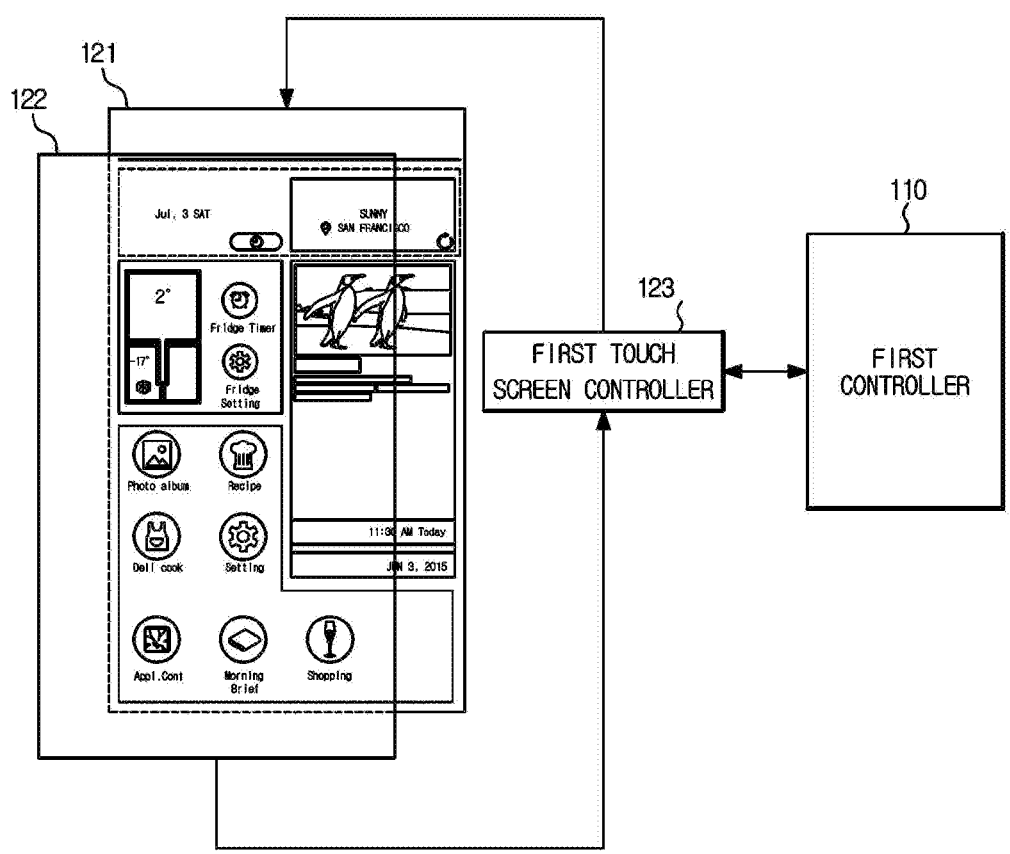
FIG. 4 is a view illustrating a touch screen display included in a first main body according to an embodiment.
Figure 5:
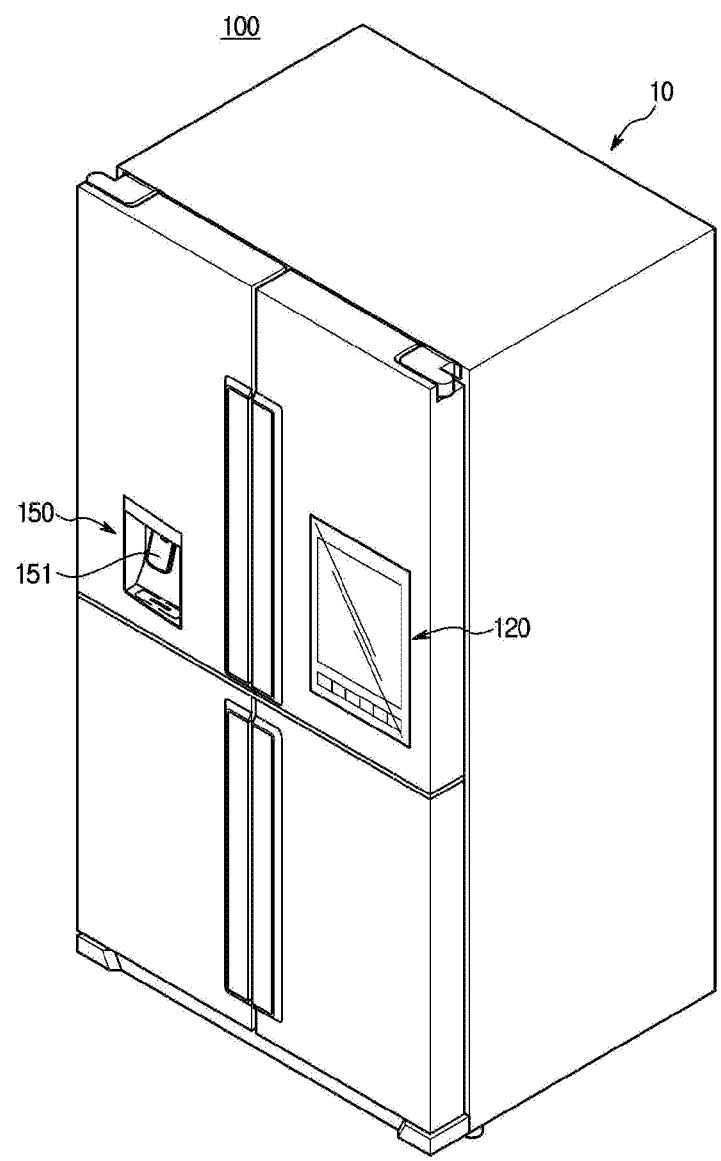
FIG. 5 is a view illustrating an input included in a first main body according to an embodiment.
Figure 6:
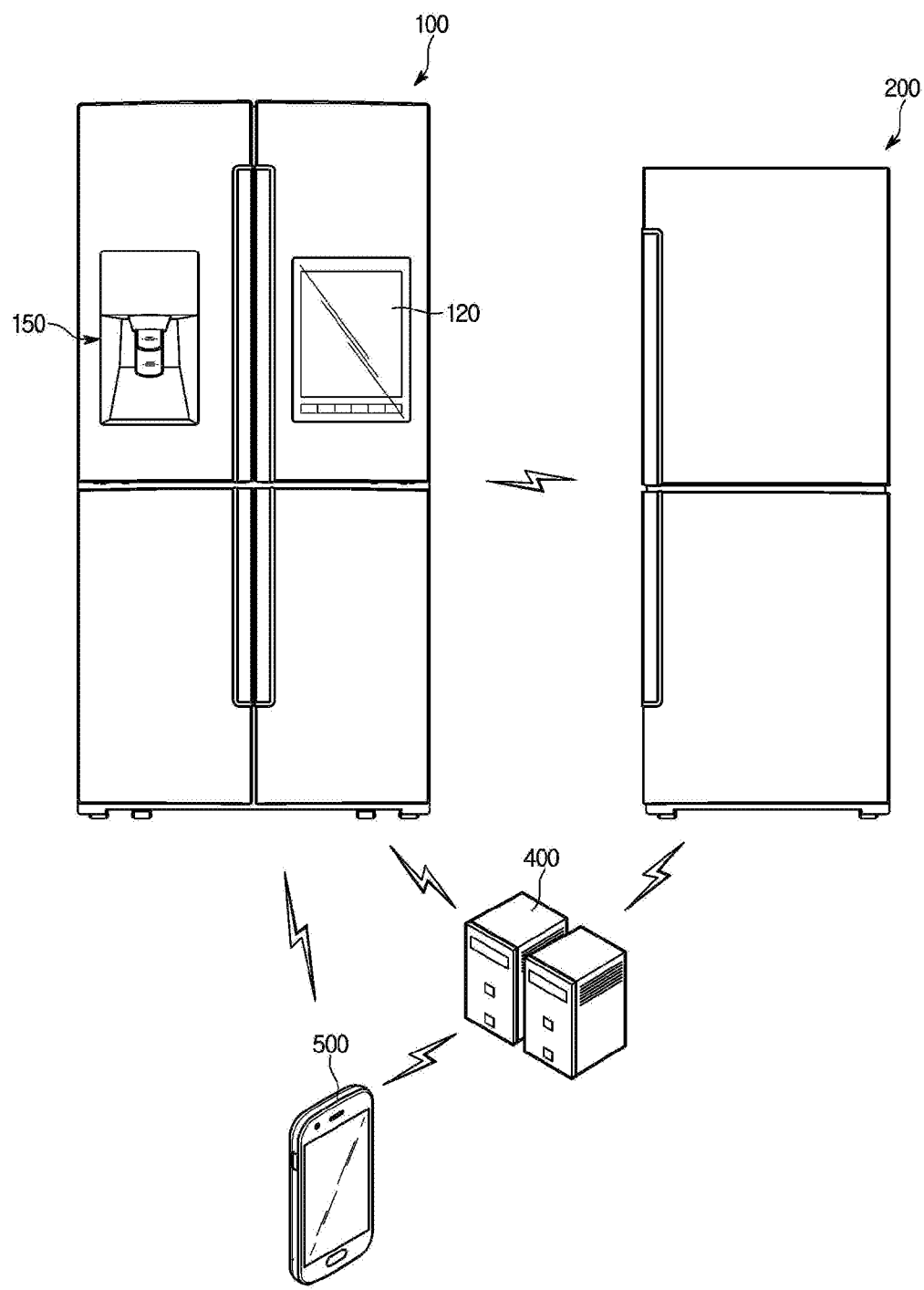
FIG. 6 is a view showing a relationship between a first main body, a second main body, an external server, and a user terminal according to an embodiment.
Figure 7:
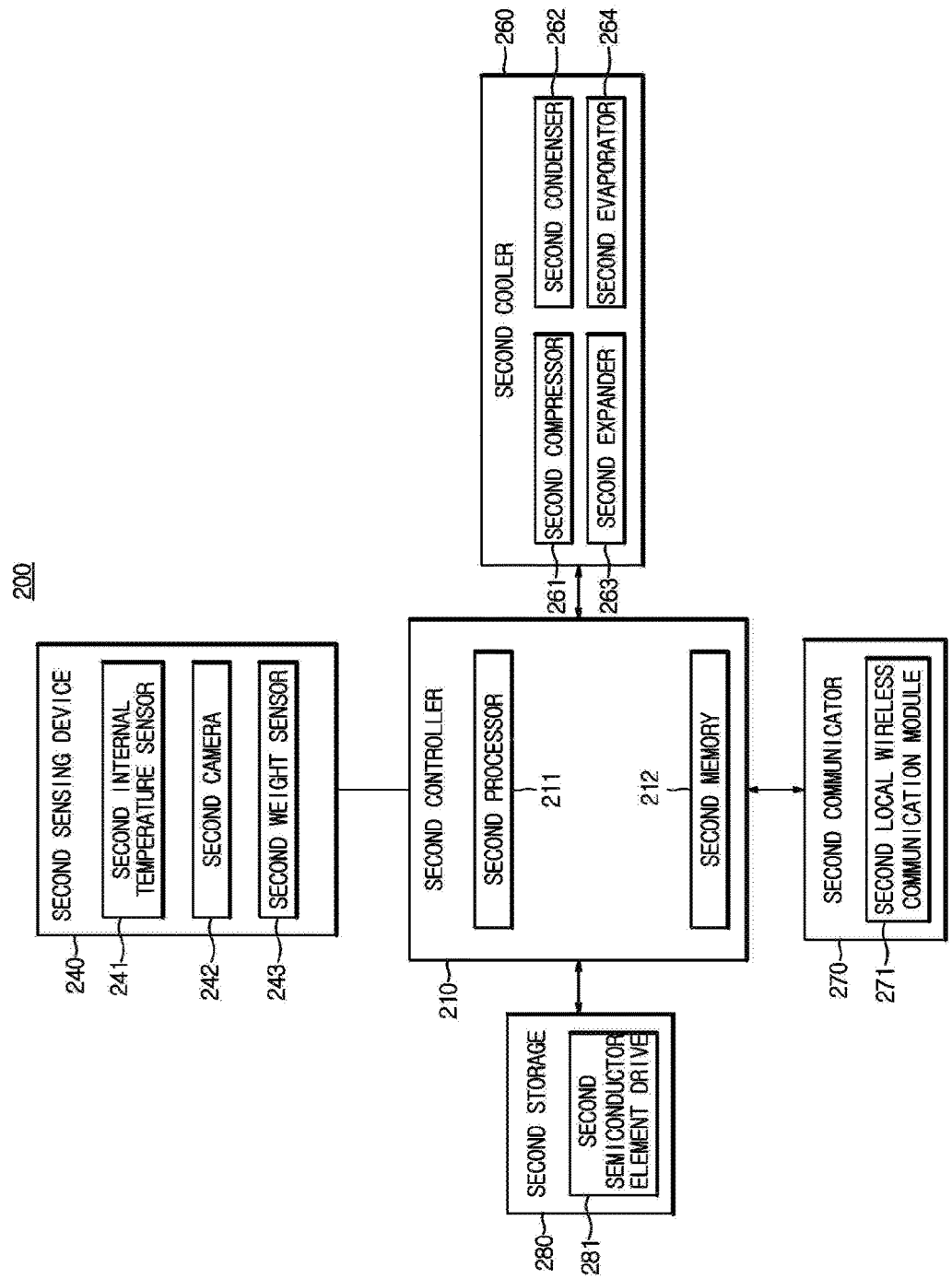
FIG. 7 is a view illustrating some components of a second main body according to an embodiment.

FIG. 1 is a view illustrating the external appearance of a refrigerator 10 including a first main body 100 and a second main body 200 according to an embodiment, FIG. 2 is a front view of the first main body 100 according to the embodiment, FIG. 3 is a block diagram illustrating some components of the first main body 100 according to the embodiment, FIG. 4 is a view illustrating a first display 120 included in the first main body 100 according to the embodiment, FIG. 5 is a view illustrating an input 130 included in the first main body 100 according to the embodiment, FIG. 6 is a view showing a relationship between the first main body 100, the second main body 200, an external server 400, and a user terminal 500 according to the embodiment, and FIG. 7 is a view illustrating some components of the second main body 200 according to an embodiment.

Referring to FIG. 1, the refrigerator 10 includes: the first main body 100 including the first display 120, the first input 130, and a first dispenser 150; and a second main body 100 not including a display. The first main body 100 and the second main body 200 may be connected to each other through wireless communication.

In addition, the first main body 100 may include a first storage chamber 20 for storing stored contents and the second main body 200 may also include a second storage chamber 320 for storing stored contents.

Although the following description will be made in relation to the components of the first main body 100 in order to avoid redundancy in description, it should be understood that the second main body 200 may also include the same components as those of the first main body 100. That is, although the second main body 200 is illustrated as having no display, the present disclosure is not limited thereto, and the second main body 220 may include a second display (not shown).

Referring to FIG. 2, the first main body 100 includes a housing 40 having a front surface opened, the first storage chamber 20 formed inside the housing 40 and keeping food items refrigerated and/or frozen, and a door 30 that opens and closes the open front surface of the housing 40.

The housing 40 may form the external appearance of the first main body 100. The housing 40 may include an inner case 41 forming the first storage chamber 20 and an outer case 42 coupled to the outer side of the inner case 41 to form the external appearance. A heat insulating material (not shown) for preventing outflow of cold air from the first storage chamber 20 may be filled between the inner case 41 and the outer case 42 of the housing 40.

The first storage chamber 20 may be partitioned into a plurality of sections by a horizontal partition 21 and a vertical partition 22.

For example, as shown in FIG. 1, the first storage chamber 20 may be divided into an upper first storage chamber 20a and lower first storage chambers 20b and 20c. The first storage chamber 20 may be provided with a shelf 23 on which a stored content, such as grocery, foods, or the like may be placed, and a sealed container 24 hermetically keeping the stored contents.

The first storage chamber 20 may be opened and closed by the door 30. For example, as shown in FIG. 1, the upper first storage chamber 20a may be opened and closed by an upper first door 30aa and an upper second door 30ab, and the lower first storage chambers 20b and 20c may be opened and closed by a lower first door 30b and a lower second door 30c.

The first main body 100 may include a first camera 142 that photographs a stored content stored in the first storage chamber 20 and acquires image information about the stored content.

In detail, the first camera 142 may include first cameras 142a and 142b that photograph stored contents in the upper first storage chamber 20a and first cameras 142c and 142d that photograph stored contents in the lower first storage chambers 20b and 20c. Images taken by the first camera 142 may be transmitted to a first controller 110.

Referring to FIG. 3, the first main body 100 may include the first display 120, the first input 130, a first sensing device 140, the first dispenser 150, a first cooler 160, a first communicator 170, a first storage 180, and the first controller 110.

The first display 120 may include a first display panel 121 to display an image or video to the outside. The first display panel 121 may be provided using a cathode ray tube (CRT) display panel, a liquid crystal display (LCD) panel, a light emitting diode (LED) panel, an organic light emitting diode (OLED) panel, a plasma display panel (PDP), and a field emission display (FED) panel.

In addition, the first display panel 121 is not limited thereto, and the first display panel 121 may employ various displays capable of visually displaying an optical image corresponding to image data.

In addition, the first display 120 may be provided using a touch screen display as shown in FIG. 4. In this case, the first display 120 includes a first display panel 121 for displaying an image, a first touch panel 122 for receiving a touch input, and a first touch screen controller 123 for driving or controlling the first display panel 121 and the first touch panel 122.

The first display panel 121 may convert image data received from the first controller 110 through the first touch screen controller 123 into an optical signal that may be viewed by a user.

The first touch panel 122 may receive a user's touch input to the first touch panel 122 and output an electrical signal corresponding to the received touch input to the first touch screen controller 123.

For example, the first touch panel 122 senses a touch of the user with respect to the first touch panel 122 from a change in the electrical resistance value or a change in capacitance, and outputs an electrical signal corresponding to coordinates of a touch point of the user to the first touch screen controller 123. The first touch screen controller 123 may determine the coordinates of the touch point of the user on the basis of the electrical signal received from the first touch panel 122.

The first touch panel 122 may be positioned on a front surface of the first display panel 121. In other words, the first touch panel 122 may be provided on a surface on which an image is displayed. To this end, the first touch panel 122 may be formed of transparent material such that an image displayed on the first display panel 121 is not distorted.

The first touch panel 122 may be provided using a resistive touch panel or a capacitive touch panel. However, the first touch panel 122 is not limited thereto, and may be provided using various touch panels that may sense a touch or approach of a user, and output an electrical signal corresponding to the coordinates of the sensed touch point or approach point.

The first touch screen controller 123 may control operations of the first display panel 121 and the first touch panel 122.

For example, referring to FIG. 4, the first touch screen controller 123 may control the first touch panel 122 to detect coordinates of a touch point of a user and control the first display panel 121 to display an optical image corresponding to image data received from the first controller 110.

According to an embodiment, the first touch screen controller 123 may determine the coordinates of a touch point of the user on the basis of an electrical signal output from the first touch panel 122 and output the coordinate of the touch point of the user to the first controller 110.

In addition, according to an embodiment, the first touch screen controller 123 may transmit an electrical signal output from the first touch panel 122 to the first controller 110 such that the first controller 110 determines the coordinate of the touch point of the user.

The first touch screen controller 123 includes a memory in which programs and data for controlling operations of the first display panel 121 and the first touch panel 122 are stored and a microprocessor that performs operational functions for controlling the operations of the first display panel 121 and the first touch panel 122 according to the program and data stored in the memory. The memory and the processor of the first touch screen controller 123 may be provided as separate chips or as a single chip.

As such, when the first display 120 is provided using a touch screen display, a touch input may be received from a user and an image may be displayed according to the touch input of the user.

The first display 120 may be provided on one side of the first main body 100 for the convenience of the user as shown in FIG. 1.

For example, as shown in FIG. 2, the first display 120 may be installed on the upper second door 30*ab*. In the following description, the first display 120 is illustrated as being installed on the upper second door 30*ab* of the first main body 100, but the installation position of the first display 120 is limited to the upper second door 30*ab*.

For example, the first display 120 may be installed at any position which is viewed by a user, for example, the upper first door 30*aa*, the lower first door 30*b*, the lower second door 30*c*, and the outer case 42 of the housing 40.

In addition, the first display 120 may have a wake-up function that is automatically activated when the user approaches a region within a certain range of the first display 120. For example, when the user approaches a region within a certain range of the first display 120, the first display 120 may be activated. In other words, the first display 120 may be turned on.

In addition, the first display 120 may be deactivated when a predetermined time has elapsed after the user is out of a region within a certain range of the first display 120. In other words, the first display 120 may be turned off.

The first display 120 may display various screens or images. A screen or an image displayed on the first display 120 will be described in detail below.

The first input 130 may receive information about a stored content that is taken into or out of the first main body 100.

In detail, the first input 130 may receive information about the stored contents directly from the user through the first display 120 or using at least one of a first bar code reader 131, a first QR reader 132, a first RFID reader 133, and a first image reader 134.

The information about the stored content may include at least one of the type of the stored content, the name of the stored content, the purchase date of the stored content, the stored location of the stored content, and the shelf lifetime of the stored content.

The first sensing device 140 may include a first internal temperature sensor 141, the first camera 142, a first weight sensor 143, and like. The first sensing device 140 may periodically photographs the stored contents stored in the first storage chamber to acquire image information about the stored contents.

Referring to FIG. 5, the first dispenser 150 may discharge water or ice according to a user input. In other words, the first dispenser 140 enables a user to directly take out water or ice without opening the door 30.

The first dispenser 150 may include a first lever 151 for receiving a discharge command of a user, a first nozzle 152 for discharging water or ice, a first display panel 153 for displaying an operating state of the first dispenser 150.

The first dispenser 150 may be installed at an outside of the housing 40.

For example, as shown in FIG. 1, the first dispenser 150 may be installed on the upper first door 30*aa*. Although the following description will be made in relation that the first dispenser 150 is installed on the upper first door 30*a*, the installation position of the first dispenser 150 is not limited thereto, and the first dispenser 150 may be installed at any position as long as a user can take out water or ice, such as the upper second door 30*ab*, the lower first door 30*b*, the lower second door 30*c*, and the outer case 42 of the housing 40.

The first cooler 160 may supply cool air to the first storage chamber 20. In detail, the first cooler 160 may maintain the temperature of the first storage chamber 20 to fall within a predetermined range by using evaporation of a refrigerant.

The first cooler 160 includes a first compressor 161 for compressing a gaseous refrigerant, a first condenser 162 for converting the compressed gaseous refrigerant into a liquid refrigerant, a first expander 163 for decompressing the liquid refrigerant, and a first evaporator 164 for converting the decompressed liquid refrigerant into a gaseous refrigerant.

The first cooler 160 may cool the air in the first storage chamber 20 by utilizing the phenomenon that a liquid state refrigerant absorbs thermal energy of ambient air while being converted to a gaseous refrigerant.

However, the present disclosure is not limited to that the first compressor 160 only includes the first compressor 161, the first condenser 162, the first expander 163, and the first evaporator 164.

For example, the first cooler 160 may include a Peltier element using the Peltier effect. The Peltier effect represents that when a current flows through a contact surface between two different metals, one of the metals generates heat and the other one of the metals absorbs heat. The first cooler 160 may cool the air in the first storage chamber 20 using a Peltier element.

As another example, the first cooler 160 may include a self-cooling device using the magneto-caloric effect. The magneto-thermal effect represents that a substance (a magneto-caloric substance), upon magnetized, releases heat, and upon demagnetized absorbs heat. The first cooler 160 may cool air in the first storage chamber 20 using a self-cooling device.

The first communicator 170 may communicate with a second communicator 270 of the second main body 200, the external server 400, or the user's mobile terminal 500.

In detail, the first communicator 170 may receive the image of the second storage chamber 320 from the second communicator 270 or the external server 400, or transmit the image of the first storage chamber 20 to the external server 400 or the user's mobile terminal 500.

Accordingly, the user may easily manage the stored contents in the first and second storage chambers 20 and 320 on the basis of the images of the first storage chamber 20 and the second storage chamber 320 transmitted to the mobile terminal 500.

In addition, the image received by the first communicator 170 is not limited to the image of the second storage chamber 320, and when the refrigerator 10 includes a plurality of main bodies such as a third main body and a fourth main body, may receive images of storage chambers from the respective main bodies.

Accordingly, the first communicator 170 may include a first local wireless communication module 171. The first local wireless communication module 171 may exchange data with an external device located at a relatively short distance. The first local wireless communication module 171 may communicate using communication standards, such as WiFi, Bluetooth, or Zigbee.

The first local wireless communication module 171 may include an antenna for transmitting or receiving a wireless signal to or from free space, a modulator/demodulator for modulating data to be transmitted or demodulating a received wireless signal, and the like.

The first storage 180 may include a first nonvolatile memory in which programs or data is stored and which does not lose the stored programs or data even when the power is turned off. For example, the first storage 180 may include a large capacity flash memory or a solid state drive (SSD) 181.

The first storage 180 may store control programs and control data for controlling the operation of the first main body 100 and various application programs and application data that perform various functions according to a user input.

For example, the first storage 180 may be configured to store an operating system (OS) program for managing the components and resources (software and hardware) included in the first main body 100, an image display application for displaying images, a video display application for replaying a video, a scheduler application for managing a schedule, a memo application for storing and displaying a memo, an online shopping application for purchasing a product online, and the like.

The first controller 110 includes a first memory 112 that remember programs and data for controlling the operation of the first main body 100 and a first processor 111 that generates a control signal for controlling the operation of the first main body 100 according to the programs and data remembered in the first memory 112.

In detail, the first controller 110 may allow an image of the first storage chamber 20 captured by the first camera 142 and an image of the second storage chamber 320 captured by the second camera 242 to be displayed on the first display 120.

In addition, the first controller 110 may allow an image of the first storage chamber 20 captured by the first camera 142 and an image of the second storage chamber 320 captured by the second camera 242 to be sequentially or simultaneously displayed on the first display 120.

In addition, the first controller 110 may allow an image of the first storage chamber 20 captured by the first camera 142 and an image of the second storage chamber 320 captured by the second camera 242 to be displayed on the first display 120 in different sizes according to a predetermined reference, or to be displayed on the first display 120 in a predetermined order. Details thereof will be described later.

In addition, the first controller 120 allows a list of the stored contents to be generated on the basis of the information about the stored contents, which is received from the first input 130, and the generated list to be displayed on the first display 120 sequentially or simultaneously with the images captured by the first camera 142 and the second camera 242.

In addition, the first controller 120 may classify the stored contents stored in the first storage chamber 20 and the second storage chamber 320 according to a reference input from a user, and display the stored contents as classified on the first display 120, or may display stored contents on the first display 120 such that the classified stored content is distinguished from the stored content not classified.

For convenience sake of description, images displayed on the first display 120 according to the first controller 120 are illustrated as images of the first storage chamber 20 and the second storage chamber 320. However, the present disclosure is not limited thereto, and when the first communicator 170 receives images of storage chambers of a plurality of main bodies from the plurality of main bodies, such as a third main body and a fourth main body, the received plurality of images may be displayed on the first display 120.

To this end, the first controller 120 may include the first processor 111 and the first memory 112 to perform the above described functions.

The first processor 111 may include various logic circuits and arithmetic circuits and may process data according to a program provided from the first memory 112 and generate a control signal according to a result of the processing For example, the first processor 111 may process coordinates of a touch input through the first touch screen display 120, and may determine a control command of a user according to the coordinates of the touch input. In addition, the first processor 111 may control the first communicator 170 to acquire information corresponding to a control command of a user, and may control the first touch screen display 120 to display a screen and/or an image corresponding to the control command of the user.

The first memory 112 may temporarily remember touch input data of a user input through the first touch screen display 120, and stored data in the first storage unit 130. For example, the first memory 112 may remember a screen and/or an image to be displayed on the first touch screen display 120, and may remember coordinates of a touch input of a user input through the first touch screen display 120 and a control command corresponding to the touch input.

The first memory 112 may include a volatile memory, such as a Static Random Access Memory (S-RAM) or a Dynamic Random Access Memory (D-RAM) for temporarily remembering data. In addition, the first memory 112 may include a nonvolatile memory, such as a Read Only Memory (ROM), an erasable programmable read-only memory (EPROM), an electrically erasable programmable read-only memory (EEPROM), and the like, for storing data for a long time period.

In addition, the first processor 111 and the first memory 112 may be implemented as separate chips or a single chip.

In FIG. 3, the first display 120, the first input 130, the first sensing device 140, the first dispenser 150, the first cooler 160, the first communicator 170, the first storage 180, and the first controller 110 are illustrated as components of the first main body 100, but a new component may be added or some components may be omitted if required.

FIG. 7 is a block diagram illustrating some of the components of the second main body 200 according to one embodiment.

Referring to FIG. 7, the second main body 200 includes a second sensing device 240, a second cooler 260, a second communicator 270, a second storage 280, and a second controller 210.

The second sensing device 240 may include a second internal temperature sensor 241, a second camera 242, a second weight sensor 243, and the like, and the second camera 242 may photograph a stored content in the second storage chamber 320 and acquire image information of the stored content.

The second communicator 270 may communicate with the first communicator 170 of the first main body 100 or the external server 400.

In detail, the second communicator 270 may transmit the image of the second storage chamber 320 to the first communicator 170 or the external server 400, as shown in FIG. 6.

Accordingly, the second communicator 270 may include a second local wireless communication module 271. The second local wireless communication module 271 may exchange data with an external device located at a relatively short distance. The second local wireless communication module 271 may communicate using communication standards, such as WiFi, Bluetooth, or Zigbee.

The second cooler 260 and the second storage 280 have the same features as those of the first cooler 160 and the first storage 180 described with reference to FIG. 4, and the description thereof will be omitted.

In FIG. 7, the second sensing device 240, the second cooler 260, the second communicator 270, the second storage 280, and the second controller 210 are illustrated as components of the second main body 200, but the second main body 200 may also include a second display (not shown) and a second input (not shown).

Accordingly, the second controller 210 may allow the image of the first storage chamber 20 captured by the first camera 142 and the image of the second storage chamber 320 captured by the second camera 242 to be displayed on the second display. That is, the second controller 210 may perform the same functions as those of the first controller 110 described with reference to FIG. 4.

Figure 8:
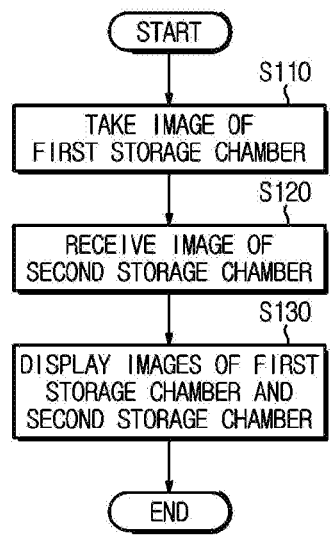
FIG. 8 is an operation flowchart showing operations of a refrigerator according to an embodiment.
Figure 9:
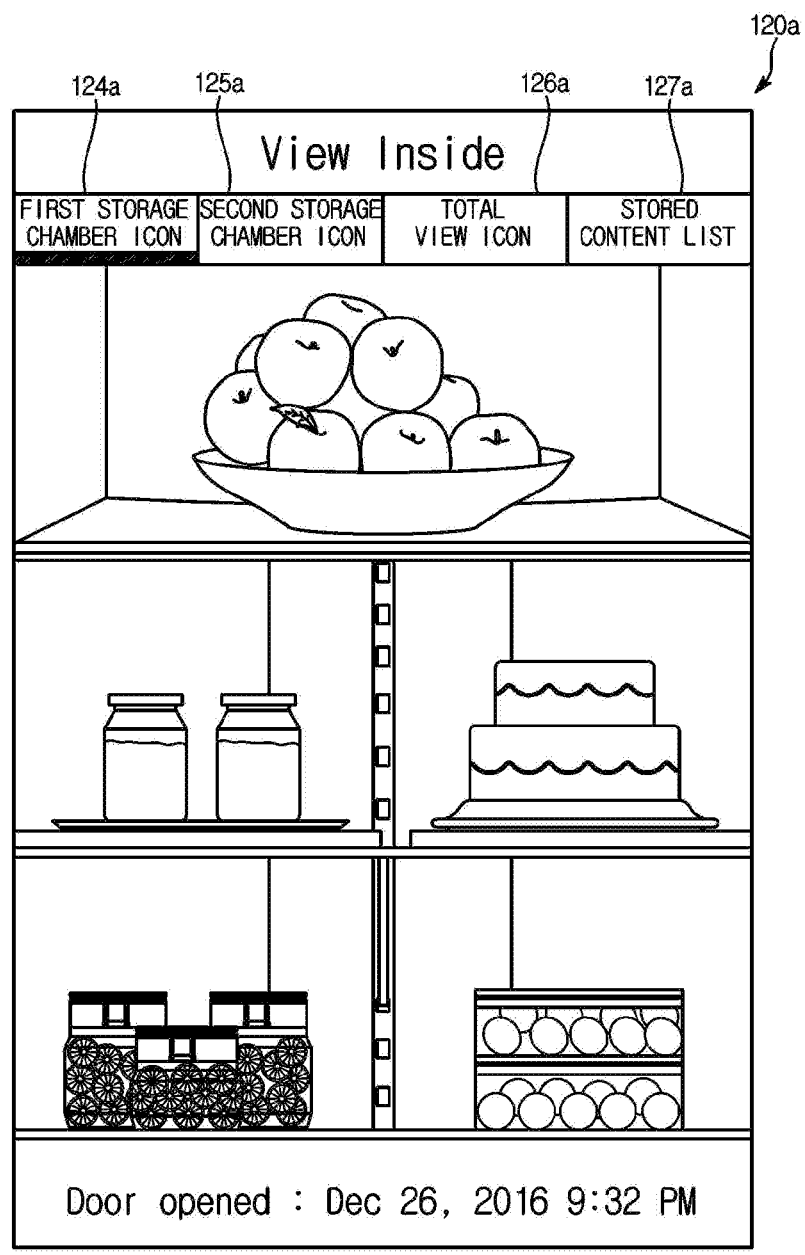
FIGS. 9 and 10 are views illustrating screens that are displayed on a first display for a first storage chamber and for a second storage chamber, respectively, according to an embodiment.
Figure 10:
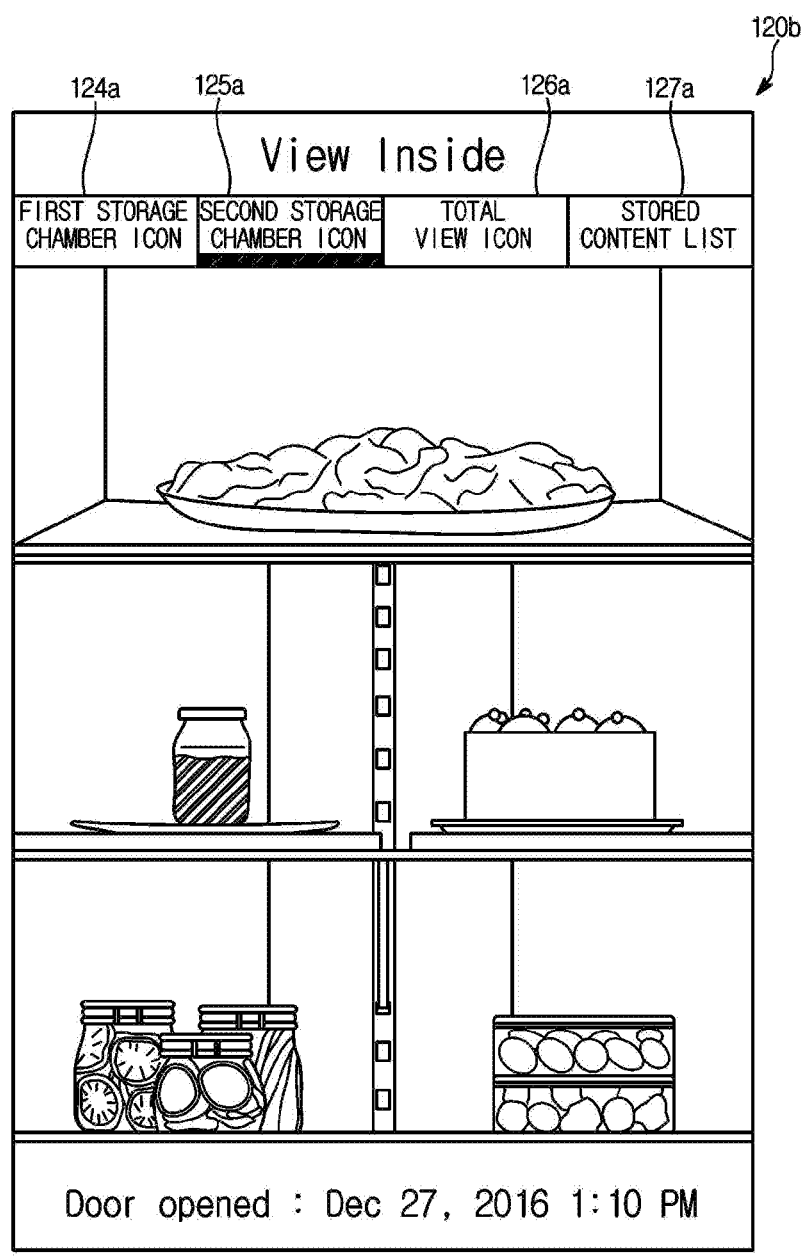
Figure 11:
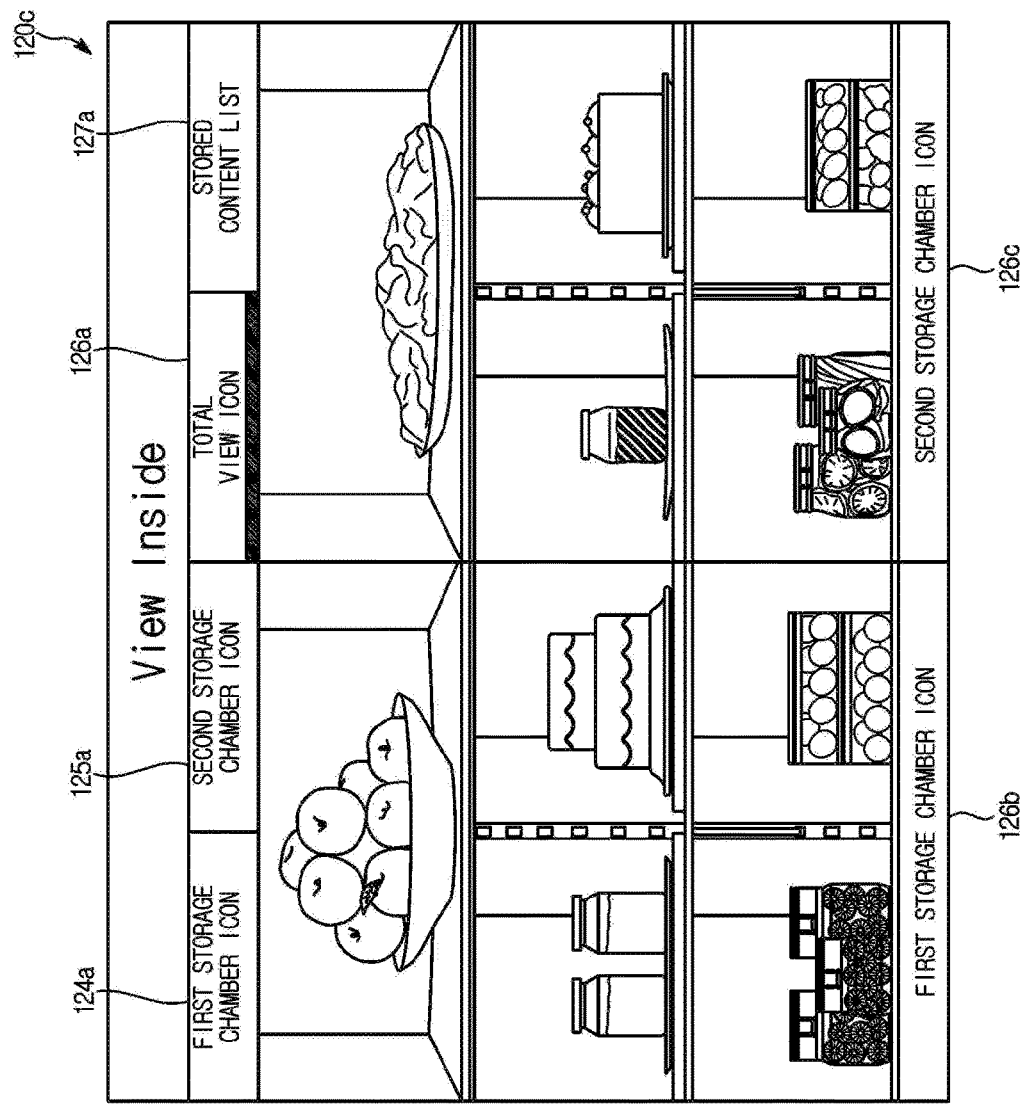
FIGS. 11 and 12 are views illustrating screens displayed on a first display, each for a first storage chamber and a second storage chamber according to another embodiment.
Figure 12:
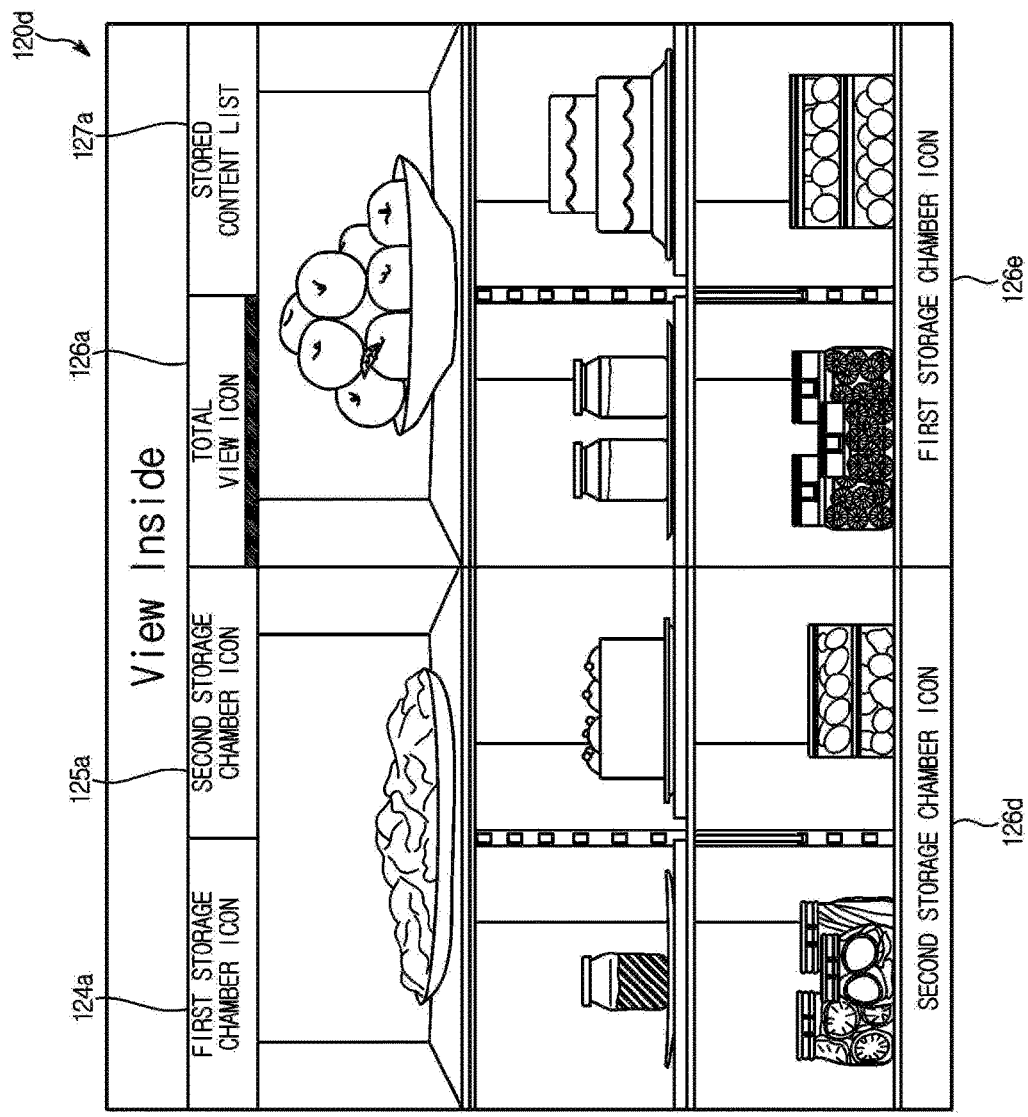
Figure 13:
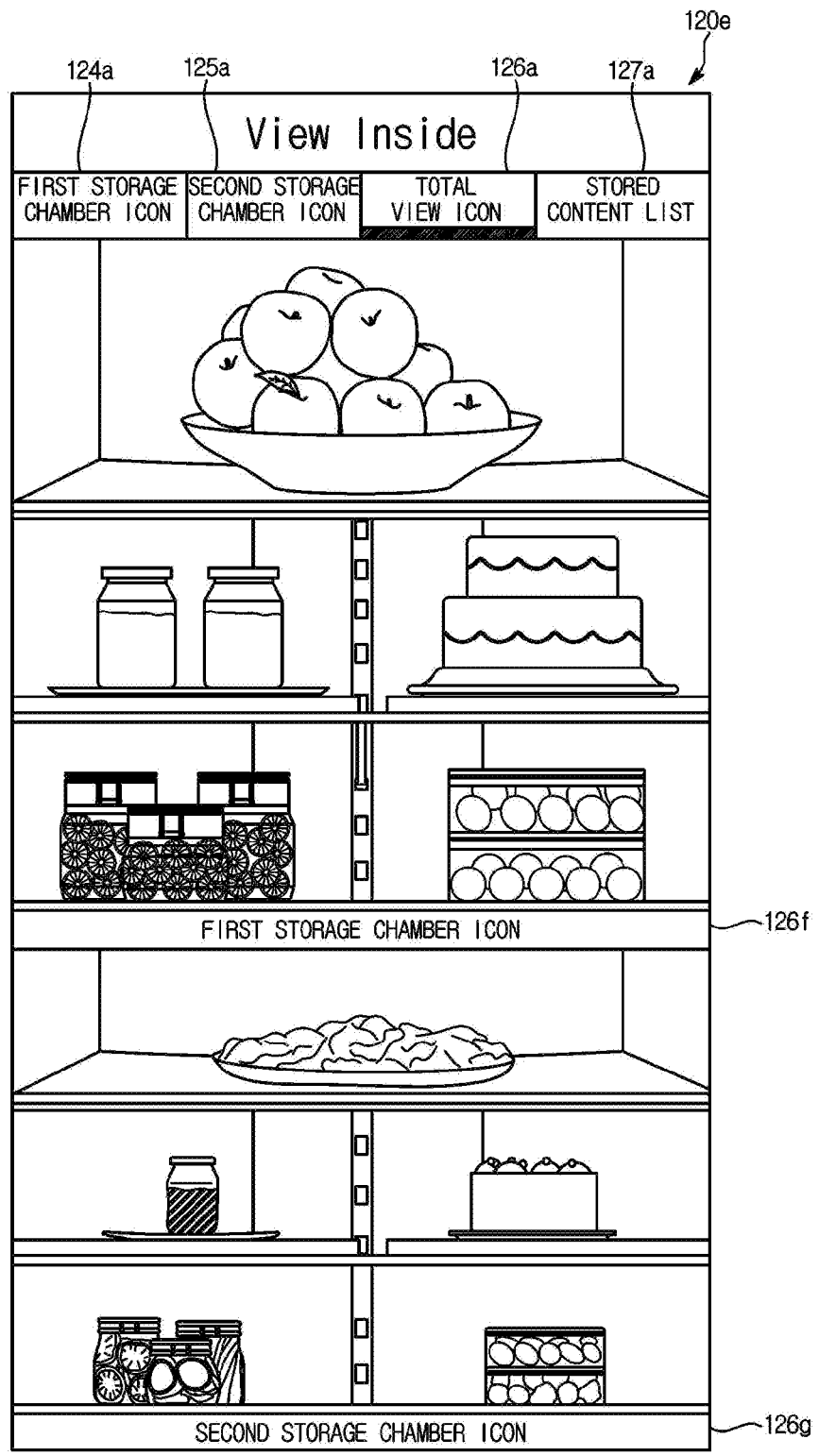
FIGS. 13 and 14 are views illustrating screens displayed on a first display for a first storage chamber and a second storage chamber according to still another embodiment.
Figure 14:
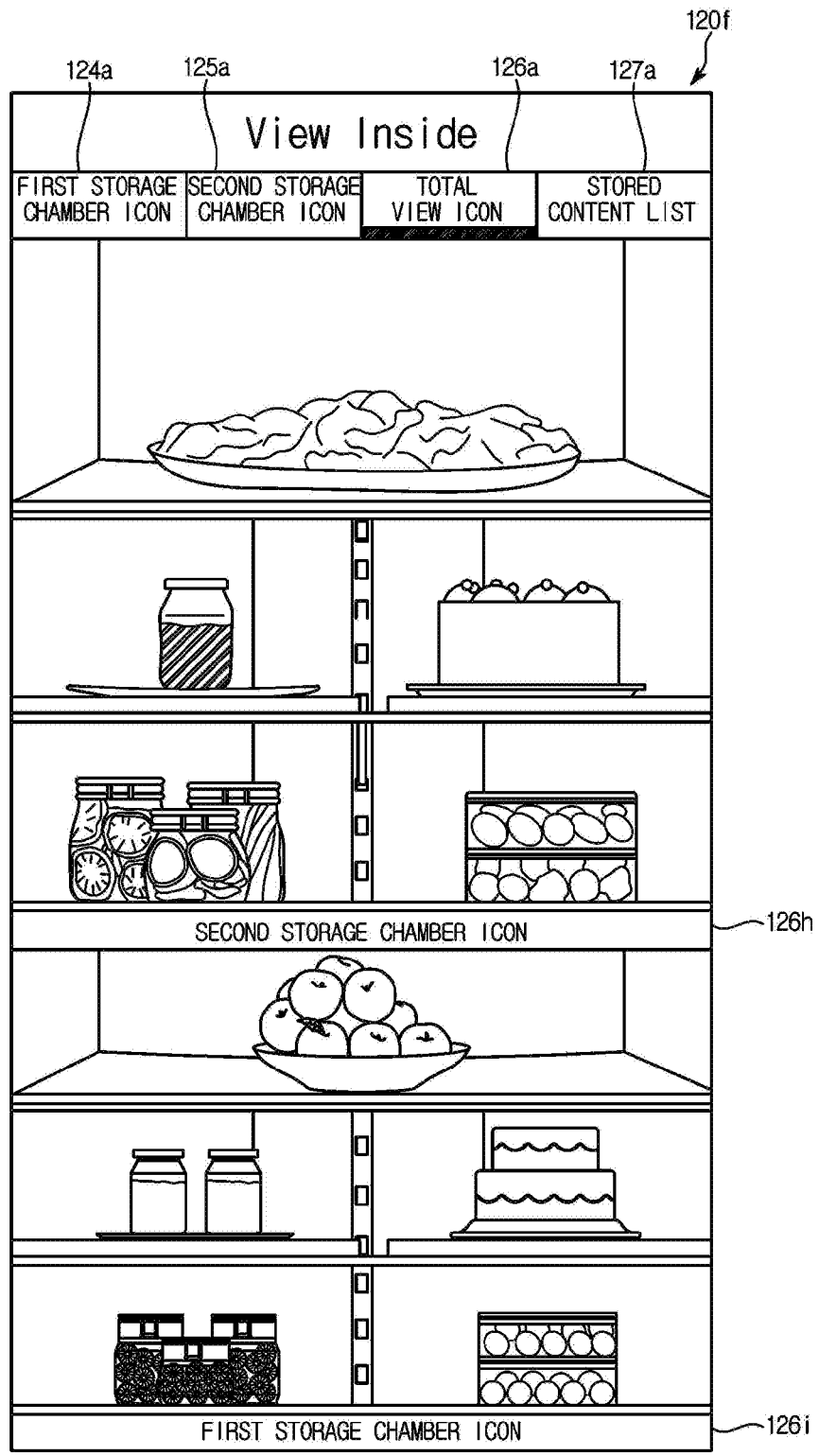

FIG. 8 is a flowchart showing an operation flow of the refrigerator 10 according to an embodiment, FIGS. 9 and 10 are views illustrating screens that are displayed on the first display 120 for the first storage chamber 20 and for the second storage chamber 320, respectively, according to an embodiment, FIGS. 11 and 12 are views illustrating screens displayed on the first display 120, each for a first storage chamber 20 and a second storage chamber 320 according to another embodiment, and FIGS. 13 and 14 are views illustrating screens for a first storage chamber 20 and a second storage chamber 320 displayed on the first display 120 according to still another embodiment.

Referring to FIG. 8, the refrigerator 10 may photograph the first storage chamber 20 using the first camera 142. (110)

The refrigerator 10 may photograph the second storage chamber 320 using the second camera 242 and transmit the captured image of the second storage chamber 320 to the first main body 100 in which the first display 120 is provided (120).

Then, the refrigerator 10 may display the captured images of the first storage chamber 20 and the second storage chamber 320 together with each other on the first display 120 (130).

In detail, the image of the first storage chamber 20 and the image of the second storage chamber 320 may be sequentially or simultaneously displayed on the first display 120, may be displayed on the first display 120 in different sizes according to a predetermined reference, or may be displayed on the first display 120 in a predetermined order.

In addition, the refrigerator 10 may generate a list of stored contents on the basis of information about the stored contents, which is received from the first input 130, and display the generated list on the first display 120, in which the list of stored contents and the images of the first storage chamber 20 and the second storage chamber 320 may be simultaneously or sequentially displayed.

FIGS. 9 and 10 are views illustrating a screen 120a displayed on the first display 120 for the first storage chamber 20 and a screen 120b displayed on the first display 120 for the second storage chamber 320 according to the embodiment.

Referring to FIGS. 9 and 10, when a user clicks a first storage chamber icon 124a generated on the screen 120a displayed on the first display 120, an image of the first storage chamber 20 captured by the first camera 142 is displayed on the first display 120 as shown in FIG. 9.

On the contrary, when a user clicks a second storage chamber icon 125a generated on the screen 120b displayed on the first display 120, an image of the second storage chamber 320 captured by the second camera 242 is displayed on the first display 120 as shown in FIG. 10.

In FIG. 9, the first storage chamber icon 124a for viewing an image of the first storage chamber is displayed at the left end of the screen 120a displayed on the first display 120, and the second storage chamber icon 125a for viewing an image of the second storage chamber is displayed on the right side of the first storage chamber icon 124a, but the display method is not limited thereto.

The user may set the second storage chamber icon 125a to be displayed at the left end of the screen 120a displayed on the first display 120 and may set the first storage chamber icon 124a to be displayed on the right side of the second storage chamber icon 125a. That is, the user may change the order in which the images of the first storage chamber 20 and the second storage chamber 320 are displayed according to a user's preference.

FIGS. 9 and 10 illustrate an example in which the first storage chamber icon 124a, the second storage chamber icon 125a, the total view icon 126a, and the storage content list icon 127a are displayed on the upper portion of the screen, and when a user clicks a desired icon, an image corresponding to the icon is displayed on the central portion of the first display 120. However, on the upper portion of the screen, only the first storage chamber icon 124a and the second storage chamber icon 125a or only the first storage chamber icon 124a, the second storage chamber icon 125a, and the storage content list icon 127a may be displayed.

FIGS. 11 and 12 are views illustrating a screen 120c and a screen 120d displayed on the first display 120 according to another embodiment, each of which simultaneously displays an image of the first storage chamber 20 and an image of the second storage chamber 320.

Referring to FIG. 11, when a user clicks a total view icon 126a generated on the screen 120c displayed on the first display 120, an image of the first storage chamber 20 captured by the first camera 142 and an image of the second storage chamber 320 captured by the second camera 242 may be displayed in a single screen 120c on the first display 120.

In order to prevent user's confusion, a first storage chamber icon 126b indicating a screen of the first storage chamber 20 is displayed on a lower left side of the screen 120c displayed on the first display 120, and a second storage chamber icon 126c indicating a screen of the second storage chamber 320 is displayed on a lower right side of the screen 120c displayed on the first display 120.

On the contrary, referring to FIG. 12, an image of the second storage chamber 320 may be displayed on the left side of the screen 120d displayed on the first display 120 and an image of the first storage chamber 20 may be displayed on the right side of the screen 120d.

That is, the refrigerator 10 according to an embodiment may change the order in which the images of the first storage chamber 20 and the second storage chamber 320 are displayed on the first display 120 according to a user's setting, thus the user may have a screen suitable for his or her preference.

FIGS. 13 and 14 are views illustrating screens 120e and 120f displayed on the first display 120 according to still another embodiment, each of which simultaneously shows an image of the first storage chamber 20 and an image of the second storage chamber 320.

Referring to FIG. 13, when a user clicks a total view icon 126a generated on the screen 120e displayed on the first display 120, an image of the first storage chamber 20 captured by the first camera 142 and an image of the second storage chamber 320 captured by the second camera 242 may be displayed in a single screen on the first display 120. At this time, the image of the first storage chamber 20 is displayed in a size larger than that of the image of the second storage chamber 320.

That is, when the user views the image of the first storage chamber 20 more frequently than the image of the second storage chamber 320, the image of the first storage chamber 20 is set to be displayed in a size larger than that of the image of the second storage chamber 320 as shown in FIG. 13 such that the image of the first storage chamber 20 may be more intuitively viewed.

In order to prevent a user's confusion, a first storage chamber icon 126f indicating a screen of the first storage chamber 20 and a second storage chamber icon 126g indicating a screen of the second storage chamber 320 are displayed together with each other on the central portion of the screen 120e displayed on the first display 120.

On the contrary, referring to FIG. 14, an image of the second storage chamber 320 may be displayed on the upper side of an image of the first storage chamber 20, and may be displayed in a size larger than that of the image of the first storage chamber 20 according to the user's setting.

That is, the refrigerator 10 according to an embodiment of the present disclosure may change the sizes and orders of images of the first storage chamber 20 and the second storage chamber 320 displayed on the first display 120 according to the user's setting, thereby providing a screen suitable for a user's preference.

Figure 15:
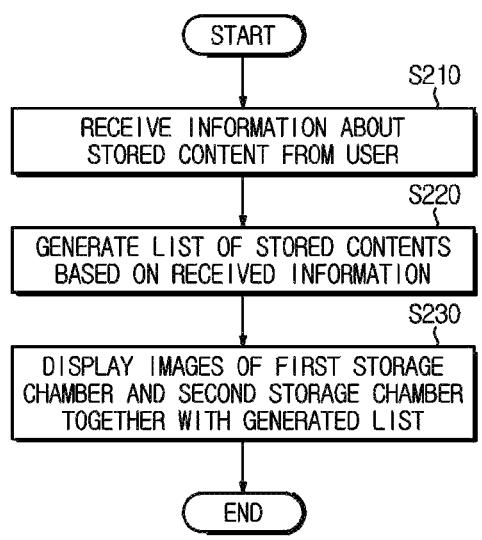
FIG. 15 is a flowchart showing an operational flow of a refrigerator according to another embodiment.
Figure 16:
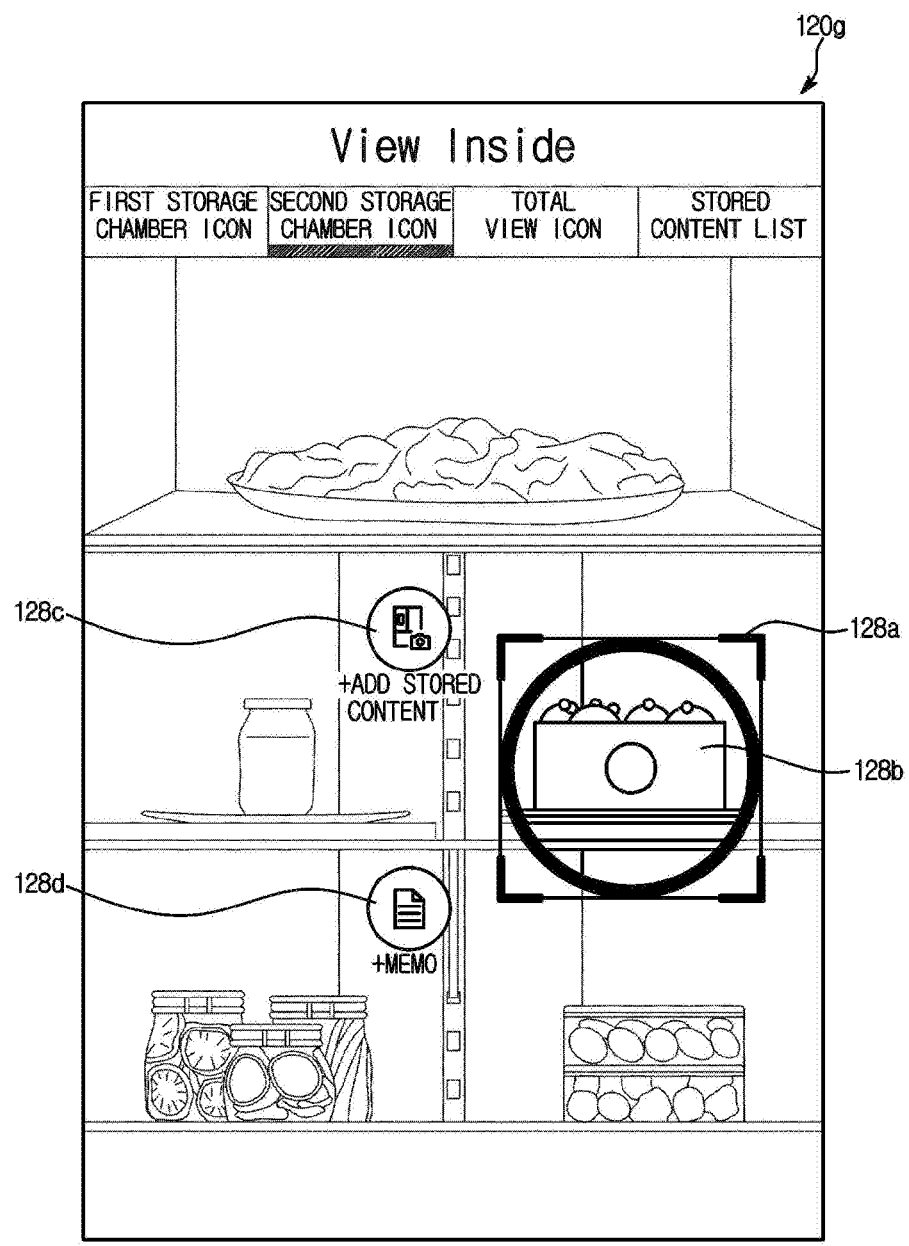
FIGS. 16 and 17 are views illustrating screens of receiving information about a stored content from a user according to an embodiment.
Figure 17:
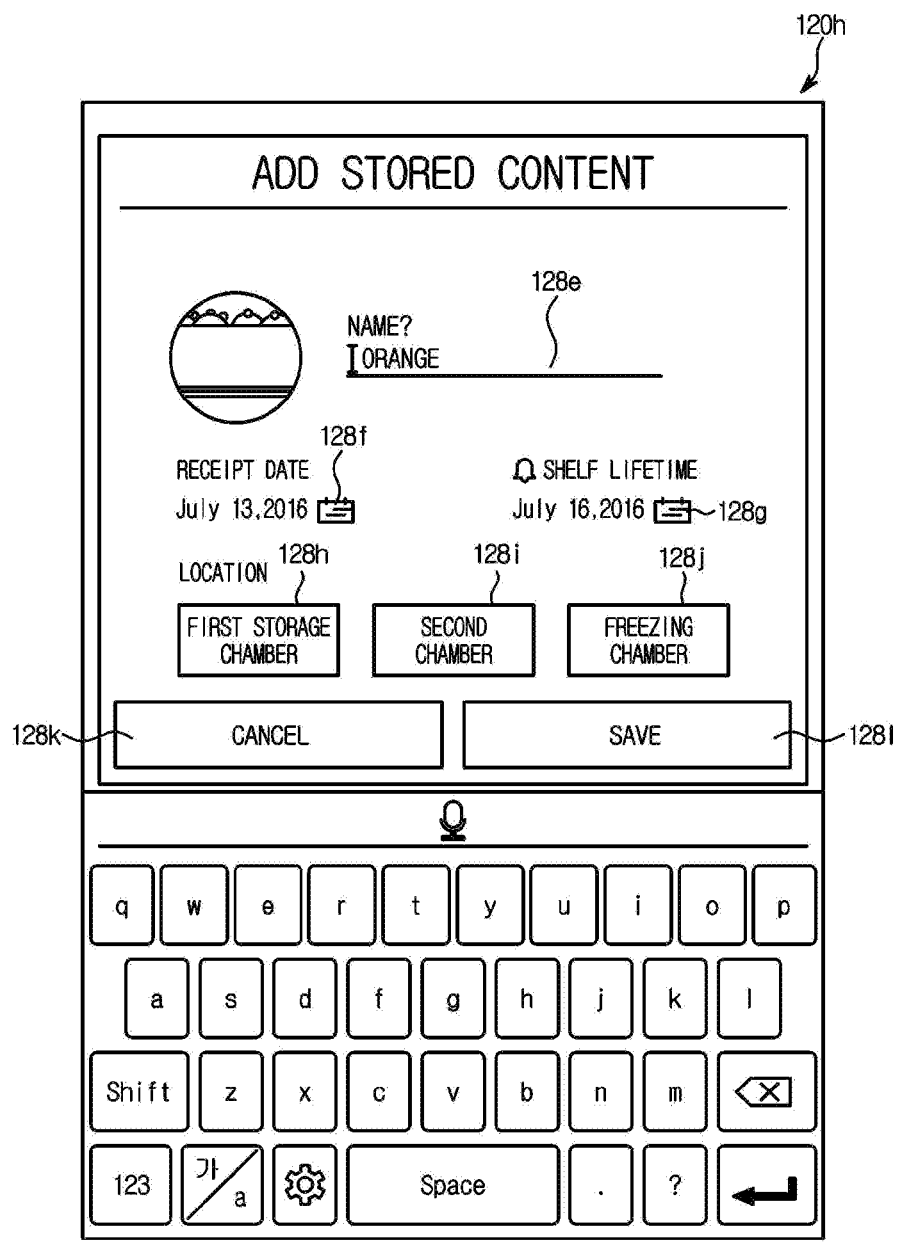
Figure 18:
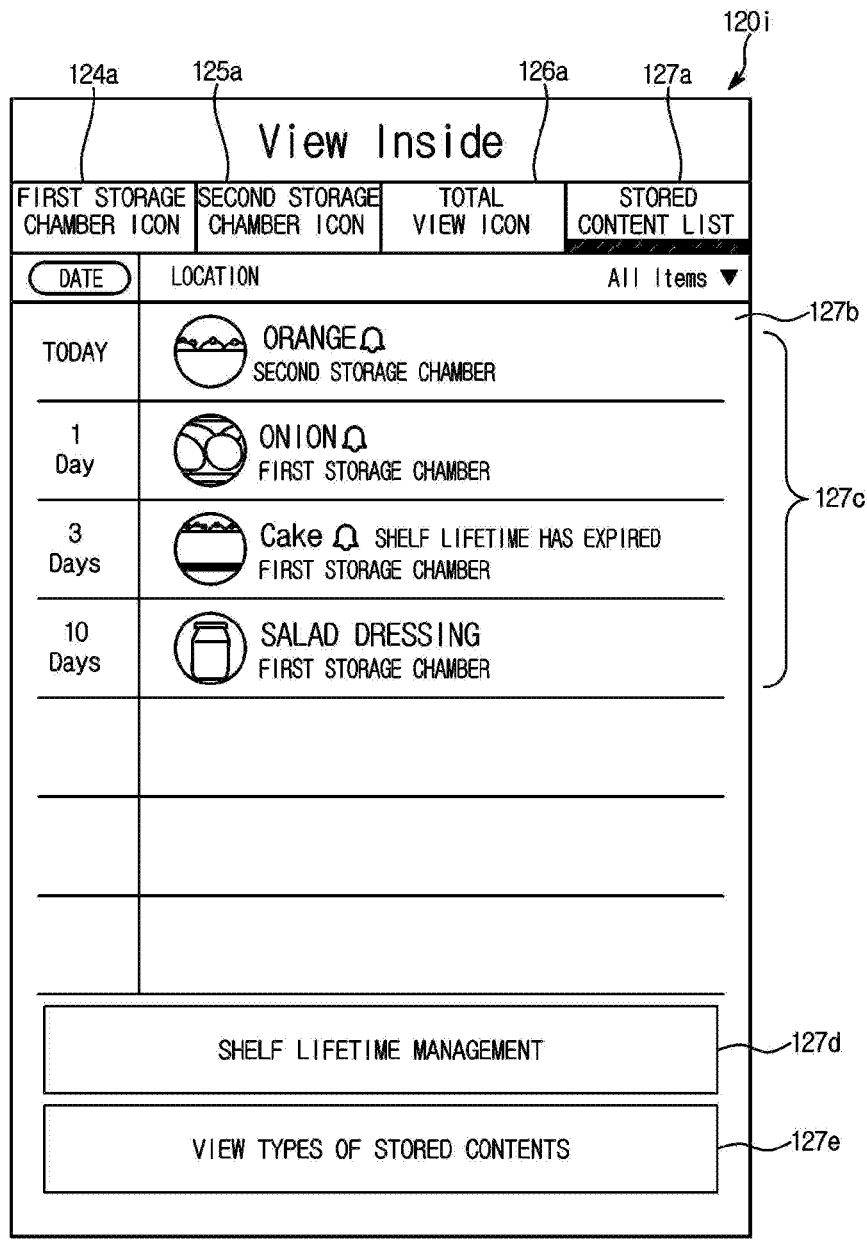
FIG. 18 is a view illustrating a screen of generating a list of stored contents on the basis of the information received from a user.

FIG. 15 is a flow chart showing an operation flow of the refrigerator 10 according to another embodiment, and FIGS. 16 and 17 are views illustrating screens of receiving information about a stored content from a user, and FIG. 18 is a view illustrating a screen of generating a list of stored contents on the basis of the information received from a user.

Referring to FIG. 15, the input 130 of the refrigerator 10 may receive information about a stored content from a user (210).

A method of receiving information about the stored content from a user may include receiving information about the stored content from a user using at least one of the first bar code reader 131, the first QR reader 132, the first RFID reader 133, and the first image reader 134.

In addition, as shown in FIGS. 16 and 17, information about the stored content may be received from a user through screens 120g and 120h displayed on the first display 120.

Referring to FIG. 16, when a user clicks or touches an orange icon 128b on the screen 120g displayed on the first display 120, a representation 128a allowing the user to confirm whether the stored content selected by the user is an orange is displayed on the first display 120 together with a storage addition icon 128c configured to add an orange to a list of stored contents and a memo icon 128d allowing a memo about the stored content to be written.

Accordingly, when the user clicks or touches the storage addition icon 128c, the screen 120h allowing a user to input detailed information about the stored content is displayed on the first display 120 as shown in FIG. 17.

The user may input at least one of a name 128e of the stored content, a receipt date 128f of the stored content, a shelf lifetime 128g of the stored content, and storage locations 128h, 128i, and 128j of the stored content using the screens displayed on the first display 120, and as finally required, click a save icon 128l to save information about the stored content.

When a user stores information about the orange as shown in FIG. 17, a list item 127b regarding the stored orange may be generated as shown in FIG. 18 and may be displayed on the first display 120 together with a list item 127c regarding previously stored all the stored contents.

Upon receipt of information about the stored contents from the user, the refrigerator 10 may generate a list of the stored contents on the basis of the received information (220).

FIG. 18 shows a screen 120i displaying an example of a generated list 127a displayed on the first display 120, and the generated list 127a may include the location of the stored content, the picture of the stored content, the type and name of the stored content, the receipt date of the stored content, and the like.

The user may identify which one of the stored contents is present in which of the storage chambers in the plurality of main bodies, and thus more easily manage the stored contents.

Upon generation of the list regarding stored contents, the refrigerator 10 may sequentially or simultaneously display the image of the first storage chamber 20, the image of the second storage chamber 320, and the generated list on the first display 120 (230).

Although FIG. 18 shows only the generated list of stored contents, the generated list may be displayed together with the images of the first storage chamber 20 and the second storage chamber 320. That is, the list may be displayed on the first display 120 together with the screen 120c shown in FIG. 11 and the screen 120i shown in FIG. 18.

Since the user may simultaneously view the screen for the first storage chamber 20, the screen for the second storage chamber 320, and the list of stored contents, the stored contents may be more easily managed.

In addition, a shelf lifetime management icon 127d for identifying shelf lifetime information about stored contents stored in the storage chambers, and a stored content type viewing icon 127e for viewing the types of stored contents may be displayed on the lower portion of the screen 120i of the first display 120. Details thereof will be described with reference to FIGS. 20 to 23.

Figure 19:
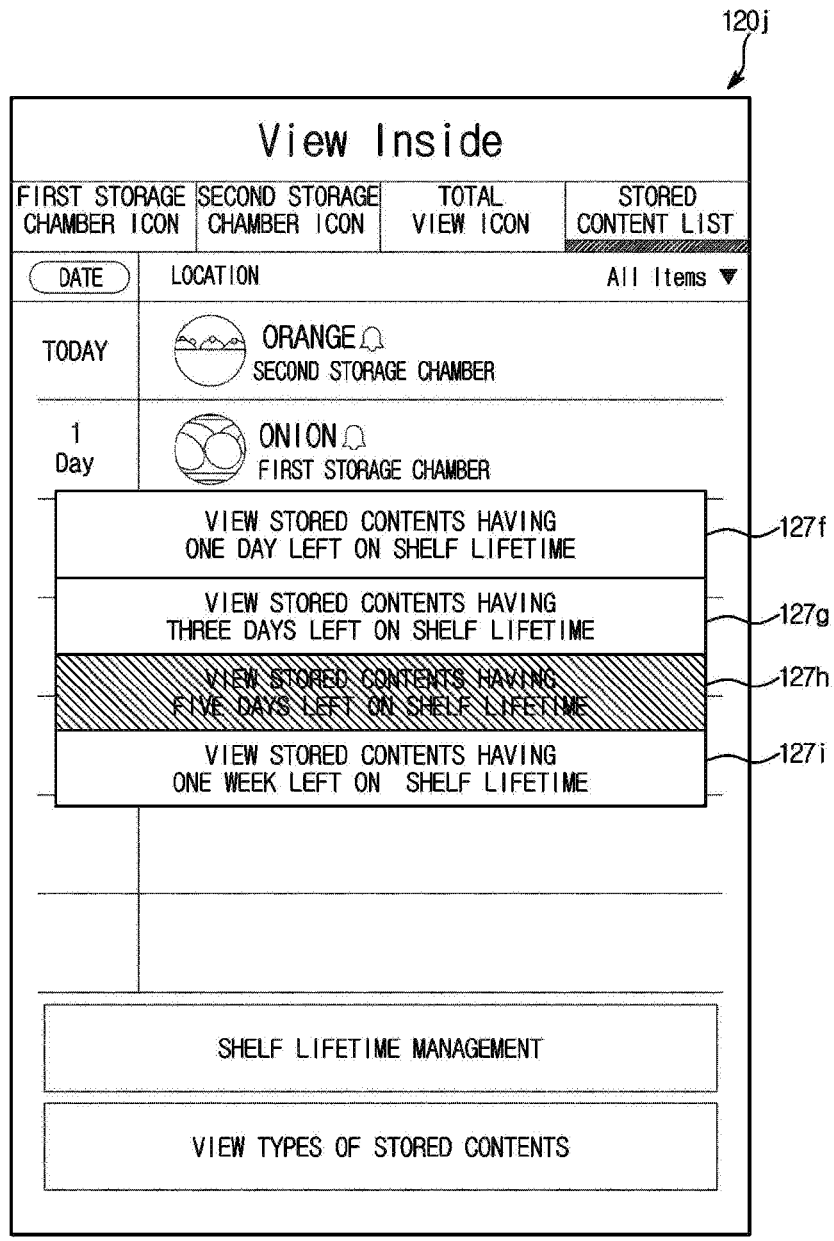
FIGS. 19 and 20 are views showing screens on which shelf lifetimes of stored contents are displayed according to an embodiment.
Figure 20:
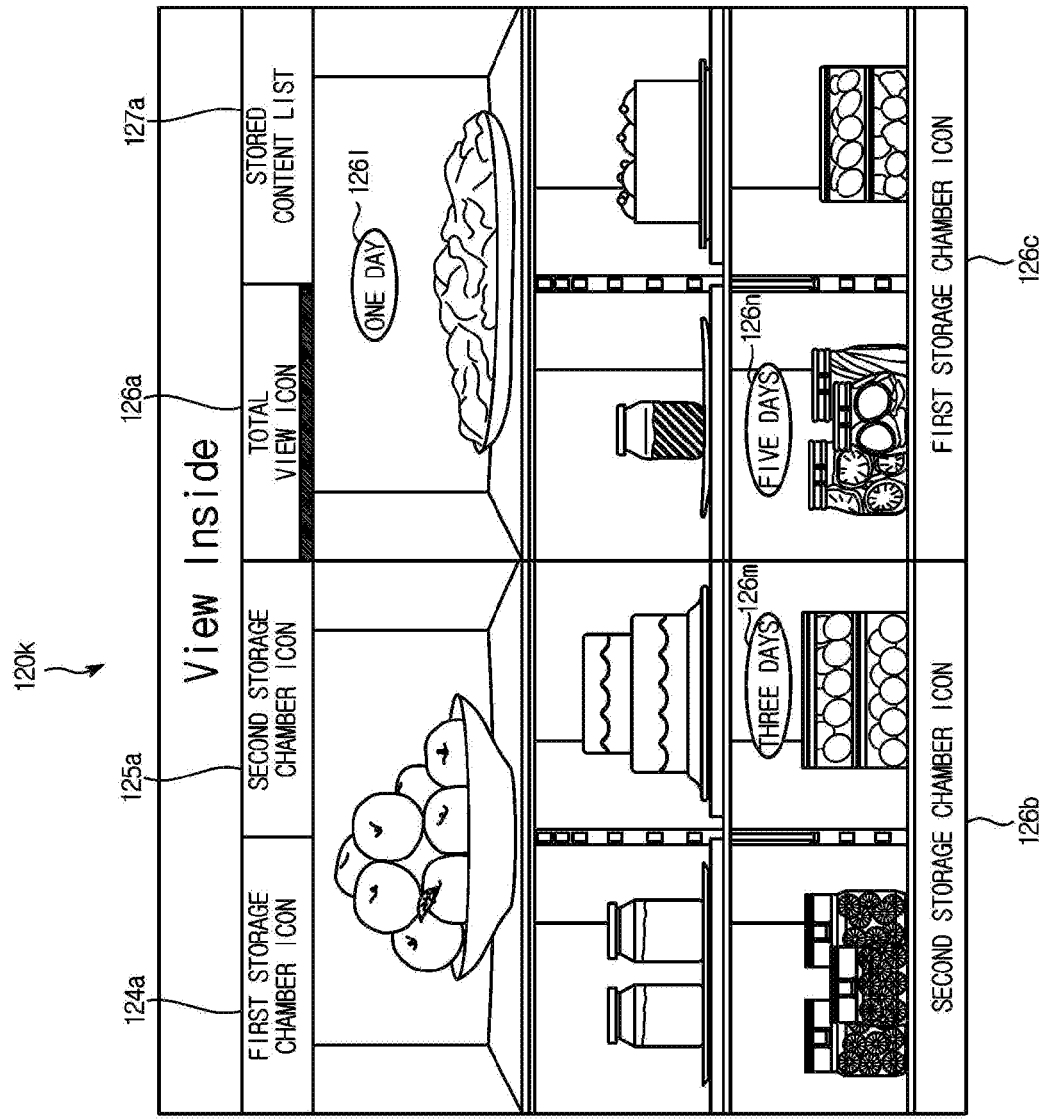

FIGS. 19 and 20 are views showing a shelf lifetime management screen displayed on the first display 120 according to still another embodiment.

In FIG. 18, when a user clicks the shelf lifetime management icon 127d, icons 127f, 127g, 127h, and 127i for viewing stored contents for which shelf lifetimes have not expired are displayed as in FIG. 19.

Although FIG. 19 illustrates one day, three days, five days, and one week as an example of the shelf lifetime, the present disclosure is not limited thereto. The shelf lifetimes to be viewed may be changed by a user freely.

Referring to FIG. 19, when a user clicks a five-day left stored content viewing icon 127*h*, the remaining shelf lifetimes of the stored contents stored in the first storage chamber 20 and the second storage chamber 320 may be displayed as shown in FIG. 20. That is, an icon 126*l* indicating that one day is left for a pizza, an icon 126*m* indicating that three days are left for an egg, and an icon 126*n* indicating that five days are left for a melon may be displayed on the first display 120.

Although FIG. 20 shows a screen set to display only the stored contents having a remaining shelf lifetime of five days or less, the present disclosure is not limited thereto. That is, although not shown in the drawing, the valid periods of all stored contents in the first storage chamber 20 and the second storage chamber 320 may be displayed on the first display 120 unless the range of the shelf lifetime is limited by a user, and when the shelf lifetime is set to one week by the user, only the stored contents for which the shelf lifetime is one week may be displayed on the first display 120.

Figure 21:
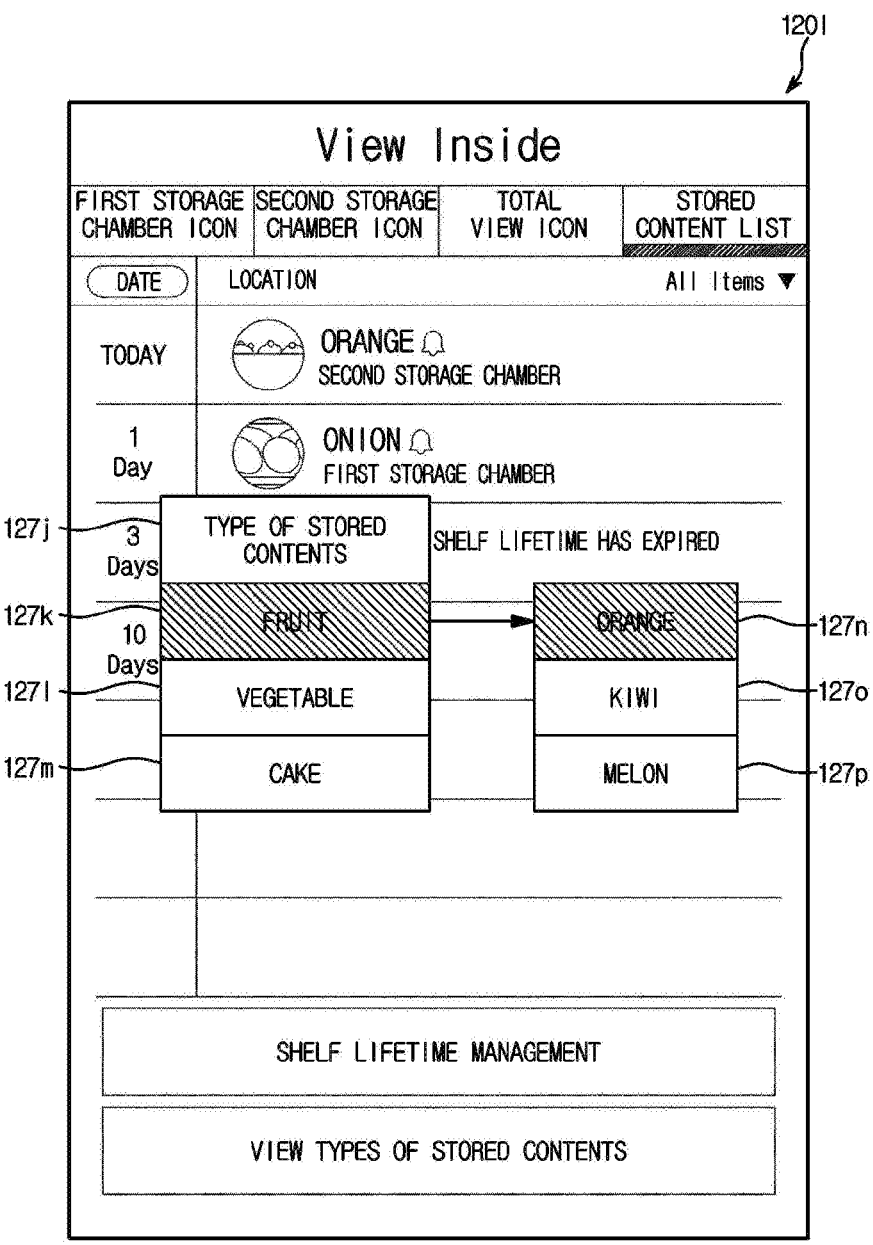
FIGS. 21, 22, 23 are views illustrating screen in which classified stored contents are displayed according to an embodiment.
Figure 22:
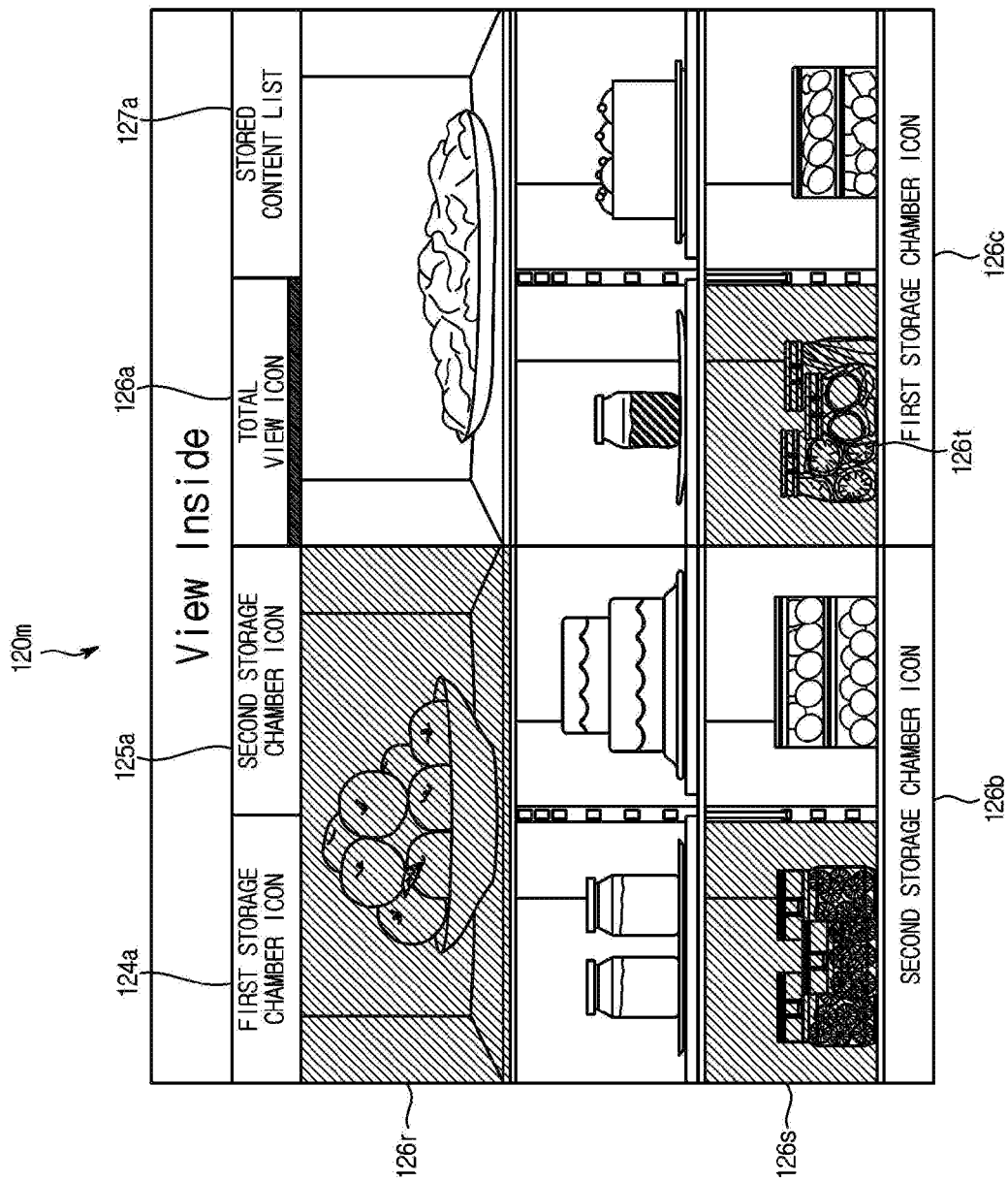
Figure 23:
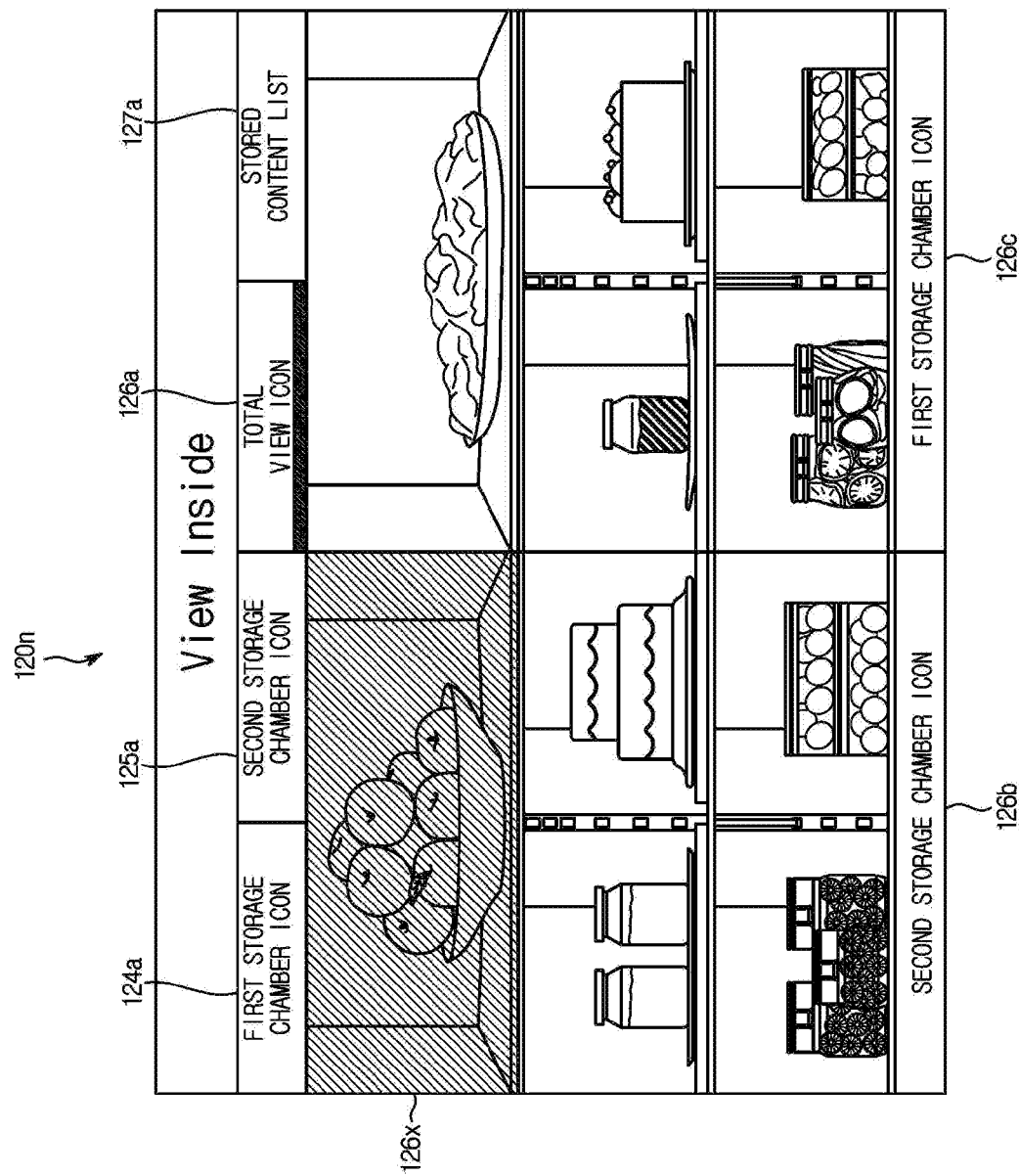

FIGS. 21 to 23 are views illustrating a screen for viewing stored contents according to types, displayed on the first display 120 according to another embodiment.

When a user clicks the shelf lifetime management icon 127*d* shown in FIG. 18, icons for identifying the types of stored contents are displayed as in FIG. 21. For example, when fruits, vegetable, and cake are stored in the storage chambers, a fruit icon 127*k*, a vegetable icon 127*o*, and a cake icon 127*p* are displayed on the first display 120 as shown in FIG. 21.

In addition, when a user clicks the fruit icon 127*k*, fruits in the first storage chamber 20 and the second storage chamber 320 may be displayed on the first display 120 as shown in FIG. 22. In detail, sections 126*r*, 126*s*, and 126*t* in which fruits are stored may be displayed to be distinguished from other sections in which other stored contents are stored.

In FIG. 21, the sections are indicated as shaded areas 126*r*, 126*s*, and 126*t* but a method of allowing the section to be distinguished is not limited thereto, and may include various methods as long as the user can distinguish the stored contents from other stored contents.

In addition, when a user double-clicks the fruit icon 126*k* or keeps touching the fruit icon 126*k* for a predetermined time period or longer, icons for indicating fruits stored in the storage chambers may be additionally displayed as shown in FIG. 21. For example, when orange, kiwi, and melon are stored in the storage chambers, an orange icon 127*n*, a kiwi icon 127*o*, and a melon icon 127*p* may be additionally displayed on the first display 120.

In addition, when a user clicks the orange icon 126*n*, oranges stored in the first and second storage chambers 20 and 320 may be displayed to be distinguished from other stored contents. In detail, a section 126*x* in which oranges are stored may be displayed to be distinguished from other sections.

In FIG. 23, the section is indicated as a shaded area 126*x* but a method of allowing the section to be distinguished from the other section is not limited thereto, and may include various methods as long as the user can distinguish the stored contents from other stored contents.

FIGS. 19 to 23 illustrate an example of displaying a shelf lifetime screen and a stored content detail view screen under the assumption that stored contents in the first storage chamber 20 and the second storage chamber 320 are displayed on the same screen. However, the present disclosure is not limited thereto. The user may set a screen for viewing stored contents in the first storage chamber 20 as a default screen and display a shelf lifetime screen and a stored content detail view screen. In addition, the user may set a screen for viewing stored contents in the second storage chamber 320 as a default screen and display a shelf lifetime screen and a stored content detail view screen. The components and operation flow of the refrigerator 10 according to the embodiments have been described with reference to the drawings.

In the conventional art, a main body not equipped with a display is difficult for a user to easily check stored contents in storage chambers, which leads to difficulty in management.

However, the refrigerator according to the embodiments allows information about stored contents in a plurality of main bodies to be displayed on a single display, so that the user can more easily manage the stored contents stored in the plurality of main bodies.

As is apparent from the above, pieces of information about stored contents stored in a plurality of main bodies are displayed on a single display, thereby enabling a user to more easily manage the stored contents stored in the plurality of main bodies.

A number of examples have been described above. Nevertheless, it will be understood that various modifications may be made. For example, suitable results may be achieved if the described techniques are performed in a different order and/or if components in a described reaction, method or composition are combined in a different manner and/or replaced or supplemented by other components or their equivalents. Accordingly, other implementations are within the scope of the following claims.

Therefore, the present disclosure covers all modifications provided they come within the scope of the appended claims and their equivalents.

The invention claimed is:

1. A refrigerator system comprising:
a first refrigerator including a first storage chamber, a first camera configured to photograph the first storage chamber, and a first display provided on at least one side of the first refrigerator; and
a second refrigerator including a second storage chamber and a second camera configured to photograph the second storage chamber,
wherein the first refrigerator further includes a first controller configured to control the first display to display an image captured by the first camera and an image captured by the second camera,
wherein the second refrigerator further includes a second communicator configured to transmit the image captured by the second camera to the first refrigerator or an external server, and
wherein the first refrigerator further includes a first communicator configured to receive the image captured by the second camera from the second communicator or the external server.

2. The refrigerator system of claim 1, wherein the first controller is configured to control the first display to display the image captured by the first camera and the image captured by the second camera sequentially or simultaneously.

3. The refrigerator system of claim 1, wherein the first controller is configured to control the first display to display the image captured by the first camera and the image captured by the second camera in different sizes according to a predetermined reference.

4. The refrigerator system of claim 1, wherein the first controller is configured to control the first display to display the image captured by the first camera and the image captured by the second camera in a predetermined order.

5. The refrigerator system of claim 1, wherein the first refrigerator further includes a first input configured to receive information about a first stored content stored in the first storage chamber and the second storage chamber.

6. The refrigerator system of claim 5, wherein the information about the first stored content includes at least one of a type of the first stored content, a name of the first stored content, a purchase date of the first stored content, a stored location of the first stored content, and a shelf lifetime of the first stored content.

7. The refrigerator system of claim 5, wherein the first controller is configured to control the first display to display a list of stored contents, including the first stored content, to be generated on a basis of the information about the stored contents.

8. The refrigerator system of claim 7, wherein the first controller is configured to control the first display to display the image captured by the first camera, the image captured by the second camera, and the generated list sequentially or simultaneously.

9. The refrigerator system of claim 1, wherein the first controller is configured to classify stored contents stored in the first storage chamber and the second storage chamber according to a reference received from a user, and display the stored contents as classified.

10. The refrigerator system of claim 9, wherein the first controller is configured to control the first display to display the classified stored contents so as to be distinguished from other stored contents not classified.

11. The refrigerator system of claim 9, wherein the reference includes at least one of a type of a first stored content among the stored contents, a name of the first stored content, and a shelf lifetime of the first stored content.

12. The refrigerator system of claim 1, wherein the first communicator transmits the image captured by the first camera and the image captured by the second camera to a mobile terminal of a user.

13. The refrigerator system of claim 1, wherein the first communicator receives an image of a stored content stored in a storage chamber of at least one other refrigerator from the external server.

14. The refrigerator system of claim 13, wherein the first controller is configured to control the first display to display the image of the stored content stored in the storage chamber of the at least one other refrigerator, the image captured by the first camera, and the image captured by the second camera sequentially or simultaneously.

15. A refrigerator comprising:
a storage chamber;
a camera configured to photograph the storage chamber;
a communicator configured to receive an image from another refrigerator;
a display; and
a controller configured to control the display to display an image captured by the camera and the received image,
wherein the received image is an image of a storage chamber of the other refrigerator,
wherein the other refrigerator further includes another communicator configured to transmit the image from the other refrigerator to the refrigerator or an external server, and
wherein the communicator is configured to receive the image from the other refrigerator from the other communicator or the external server.

\* \* \* \* \*